United States Patent [19]

Alsobrooks et al.

[11] Patent Number: 4,840,163

[45] Date of Patent: Jun. 20, 1989

[54] ELECTROMAGNET, VALVE ASSEMBLY AND FUEL METERING APPARATUS

[75] Inventors: Daniel E. Alsobrooks, Flat Rock; Hansueli Bart, Mt. Clemens; Richard Chauvin, Clawson; Thomas A. Horn, East Detroit; John H. Merte, Sterling Heights, all of Mich.; Gerhard Mesenich, Bochum, Fed. Rep. of Germany; Donna M. Mitts, Canton Township, Wayne County, Mich.

[73] Assignee: Colt Industries Inc., New York, N.Y.

[21] Appl. No.: 1,420

[22] Filed: Jan. 8, 1987

[51] Int. Cl.$^4$ ...................... F02M 39/00; F16K 11/14

[52] U.S. Cl. .................................... 123/533; 123/452; 251/129.21; 251/129.01; 137/870

[58] Field of Search ............... 123/458, 451, 533, 455, 123/452; 137/870, 871, 878, 881; 251/139.12, 129.15, 129.18, 129.21, 129.01; 361/142, 143, 146

[56] References Cited

U.S. PATENT DOCUMENTS

| | | | |
|---|---|---|---|
| 1,822,668 | 9/1931 | Protzeller | 251/129.18 |
| 2,449,438 | 9/1948 | Wisegarver | 251/129.01 |
| 2,913,231 | 11/1959 | Powell | 123/455 |
| 3,108,797 | 10/1963 | Ray | 251/129.01 |
| 3,331,042 | 7/1967 | Erickson | 251/129.01 |
| 3,460,520 | 8/1969 | Huber | 123/452 |
| 3,817,491 | 6/1974 | Burkhardt | 251/129.21 |
| 3,833,015 | 9/1974 | Knever | 251/129.21 |
| 4,132,194 | 1/1979 | Saito | 123/458 |
| 4,223,698 | 9/1980 | Reinicke | 137/870 |
| 4,554,945 | 11/1985 | McKay | 123/533 |
| 4,662,567 | 5/1987 | Knapp | 251/129.21 |
| 4,690,118 | 9/1987 | Hofbauer | 123/533 |
| 4,693,224 | 9/1987 | McKay | 123/458 |
| 4,708,117 | 11/1987 | Mesenich | 123/533 |

OTHER PUBLICATIONS

Print of drawing No. 1R-2339A "Air Horn Assembly" of Holley Carburetor Division (of Colt Industries Operating Corp) of Warren, Mich. (12/8/78).

Print of drawing No. 224R-16A "Bobbin & Terminal Assembly" of Holley Carburetor Division (of Colt Indust. Operating Corp) of Warren, Mich. (9/16/76).

*Primary Examiner*—Carl Stuart Miller

*Attorney, Agent, or Firm*—Walter Potoroka, Sr.

[57] ABSTRACT

A fuel injection fuel supply system for a combustion engine has a fuel injector valve effective for metering and injecting all of the required fuel to the engine induction system; in one version a single valve functions to supply the required fuel in equal amounts to each of the combustion cylinders of the engine through chamber means exposed to superatmospheric air; an electromagnetic assembly having a magnetic open loop is used for cyclically opening and closing the injector valve.

59 Claims, 11 Drawing Sheets

ELECTROMAGNET, VALVE ASSEMBLY AND FUEL METERING APPARATUS

FIELD OF THE INVENTION

This invention relates generally to liquid metering systems, as for example a fuel metering system for a combustion engine, and particularly to the valving assembly means employed within such a liquid metering system and with greater particularity to an electromagnetic motor means for use in operating such valving assembly means.

BACKGROUND OF THE INVENTION

Even though the automotive industry has over the years, if for no other reason than seeking competitive advantages, continually exerted efforts to increase the fuel economy of automotive engines, the gains realized thereby have been deemed by governmental bodies as being insufficient and such governmental bodies continue to impose increasingly stringent regulations relative to engine fuel economy as well as the maximum permissible amounts of carbon monoxide, hydrocarbons and oxides of nitrogen which may be emitted by the engine exhaust gases into the atmosphere.

In an attempt to meet such stringent regulations, the prior art has heretofore proposed the employment of a carburetor structure provided with electromagnetic duty-cycle valving means whereby the carburetor structure still functioned as an aspirating device but where the rate of fuel flow being aspirated is controllably modified by the duty-cycle valving means in response to feedback signals indicative of engine operation and other attendant conditions. Such carbureting structures, in the main, have not been found to be capable of satisfying the said continually increasing stringent regulations.

The prior art has also proposed the use of fuel metering injection means wherein a plurality of nozzle assemblies, situated as at the intake valves of respective cylinders of a piston engine, would receive fuel, under superatmospheric pressure, from a common fuel metering source and inject such fuel directly into the respective cylinders of the engine with such injection being done in timed relationship to engine operation. Such fuel injection systems, besides being costly, have not proven to be generally successful in that the system is required to provide metered fuel flow over a very wide range of metered fuel flows. Generally, those prior art injection systems which are very accurate at one end of the required range of metered fuel flows, are relatively inaccurate at the opposite end of that same range of metered fuel flows. Also, those prior art injection systems which are made to be accurate in the mid-portion of the required range of metered fuel flows are usually relatively inaccurate at both ends of that same range. The use of feedback means for altering the metering characteristics of such prior art fuel injection systems has not solved the problem of inaccurate metering because the problem usually is intertwined within such factors as: effective aperture area of the injector nozzle; comparative movement required by the associated nozzle pintle or valving member; inertia of the nozzle valving member; and nozzle "cracking" pressure (that being the pressure at which the nozzle opens). As should be apparent, the smaller the rate of metered fuel flow desired, the greater becomes the influence of such factors thereon.

The prior art has also heretofore proposed the employment of a throttle body with one or more electromagnetic duty-cycle type of fuel metering valving assemblies operatively carried thereby and spraying metered fuel, on a continual basis, into the air stream flowing through the throttle body and into the engine induction or intake manifold. Even though such arrangements, generally, are effective for providing closely controlled metered rates of fuel flow, they are nevertheless limited in their ability to meet the said increasingly stringent regulations. This inability is at least in part due to the fact that in such systems the throttle body is employed in combination with an engine intake or induction manifold through which the air and sprayed-fuel mixture is supplied to the respective engine cylinders. Because of design limitations, engine characteristics, cost factors and lack of repeatability in producing substantially identical intake manifolds, certain of the engine cylinders become starved for fuel when other engine cylinders are provided with their required stoichiometric fuel-air ratios. Consequently, the richness (in terms of fuel) of the entire fuel delivery system has to be increased to a fuel-air ratio which will provide the required stoichiometric fuel-air ratio to the otherwise starved engine cylinder or cylinders to obtain proper operation thereof. However, in so doing, the other engine cylinder or cylinders receive a fuel-air supply which is, in fact, overly rich (in terms of fuel) thereby resulting in reduced engine fuel economy and the increased production of engine exhaust emissions.

The prior art has also heretofore proposed the employment of a throttle body, which serves only to control the rate of air flow to an associated engine intake manifold, in combination with a plurality of electromagnetic duty-cycle type of fuel metering valving assemblies wherein respective ones of said plurality of duty-cycle valving assemblies are positioned in close proximity to respective ones of a plurality of engine cylinders as to thereby meter and discharge fuel into the induction system at respective points which are at least closely situated to the intake valves of the associated engine cylinder. In such an arrangement, it is often accepted practice to provide a common manifold of fuel, regulated at superatmospheric pressure, which feeds or supplies unmetered fuel to the respective duty-cycle valving assemblies where the metering function is performed. These systems are very costly in that a plurality of duty-cycle valving and metering assemblies are required and such valving assemblies, to obtain optimum performance, must be flow-matched to each other as sets for the engine. Further, in such arrangements, it is accepted as best practice to replace all duty-cycle valving assemblies upon failure of one or more in order to thereby again result in a matched set of injectors for the engine. Also, in such systems, if one of the injectors or duty-cycle valving means starts to malfunction, and if exhaust constituent sensor and feedback signal generating means are employed, the associated electronic control means will attempt to further increase or decrease (as the case may be) the richness of the fuel-air ratio of the remaining injector assemblies since the exhaust feedback signal cannot distinguish whether the change sensed in the exhaust constituents is due to one or more injector assemblies malfunctioning or whether the overall system needs a modification in the rate of metered fuel flow.

The prior art electromagnetic fuel metering and injector assemblies have also been found wanting. That is, in order to obtain optimum fuel metering accuracy, short and stable valve opening and closing times are essential. However, the stability of the opening and closing time is adversely affected by instabilities of the mechanical and hydraulic forces on the armature and/or valve. (The armature and valve may in fact be one and the same member.)

The variation or change in such mechanical force is due to variations or change of the coefficient of friction of the relatively moving parts or components and unstable return-spring loads with such being caused by spring oscillations.

The unstable portion of the hydraulic forces (from fuel or other liquids being metered) occurs only during the first few micrometers of armature-valve stroke, in the valve opening direction, and such can be regarded as a "break-loose-force". This break-loose-force is created by an unbalanced hydraulic force which, in turn, is caused by a vacuum effect at the contacting or sealing surface of the armature-valve. The vacuum effect occurs as the armature-valve first starts to move (in the opening direction) away from the cooperating valve seating surface. That is, when the armature-valve is in its closed position the sealing surface thereof is closed against and sealingly engaged with the juxtaposed valve seating surface. As the armature-valve starts to move in its opening direction such juxtaposed sealing and seating surfaces are separated from each other defining a flow space or flow gap therebetween. However, such flow gap is formed faster than the surrounding fuel (or other liquid to be metered) can fill it. Such a delay in the fuel filling the gap causes the vacuum effect tending to resist the opening movement of the armature-valve. Further, the break-loose-force is dependent upon the unbalanced hydraulic pressure experienced by the armature-valve and the surface finish of the juxtaposed sealing and seating surfaces defining the flow space or gap. The unbalanced hydraulic pressure changes in response to the hydraulic pressure waves in the liquid to be metered.

The surface finish of the juxtaposed sealing and seating surfaces changes due to the very high pressure, experienced by such surfaces, which occurs as when the armature-valve strikes the cooperating valve seat portion when moving in its closing direction. Depending upon the geometric configuration of the sealing and seating surfaces and therefore the flow gap, such pressures can be as high as several times 15,000.0 p.s.i. During use, such developed high pressure in effect polishes or burnishes the cooperating sealing and seating surfaces resulting in an improved surface finish in both the sealing and seating surfaces. Such an improving or improved surface finish, in turn, increases the bearing area and the fluid flow resistance thereby changing the break-loose-force during initial opening of the armature-valve. Mainly depending upon the width of the flow gap, the opening gap, generally, is filled with fuel (or other liquid to be metered) within the first 3.0 to 10.0 micrometers of the opening stroke of the armature-valve.

The instabilities of the mechanical and hydraulic forces change or alter the required magnetic force level or magnitude at the beginning of the opening movement of the armature-valve. Such an altered or changed magnitude of required magnetic force may be anywhere in a range of values, which may be termed a band of uncertainty, and such, in turn, determines the delay time of the magnetic system.

All of such factors of the prior art contribute to unstable operating characteristics of the prior art electromagnetic motor means and in particular to short stroke fast acting electromagnetic fuel valving assemblies of the prior art.

The invention as herein disclosed and described is primarily directed to the solution of the aforestated and other related and attendant problems of the prior art.

SUMMARY OF THE INVENTION

According to one aspect of the invention, a fuel metering system for an associated combustion engine having a plurality of combustion cylinders each provided with intake valve means, comprises a plurality of fuel nozzle means, a fuel metering valving member movable to and from open and closed positions to accordingly permit and terminate the flow of fuel through said plurality of nozzle means to thereby meter the rate of fuel flow through said nozzle means, electromagnetic motor means for causing said metering valving member to be moved to said open and closed positions, chamber means, conduit means for supplying air at a superatmospheric pressure to said first chamber means, and a plurality of fuel-air transport conduit means communicating with said chamber means, said plurality of fuel-air transport conduit means being effective to receive the fuel as is metered through said nozzle means and to receive the superatmospheric air received in said chamber means and deliver a flow of fluid comprised of said metered fuel and said superatmospheric air as a fuel-air emulsion to spaced receiving areas of the combustion engine, wherein said valving member comprises armature means of said electromagnetic motor means, wherein said electromagnetic motor means comprises generally tubular stationary magnetic body means of magnetic material and pole piece means situated as to be centrally of and stationary with respect to said tubular magnetic body means, electrical coil means effective upon energization to create a magnetic field, said tubular stationary magnetic body means and said pole piece means functioning to provide a magnetic flux path loop about said electrical coil means upon energization thereof, wherein said flux path loop is comprised of a non-moving portion of said electromagnetic motor means and of a moving portion of said electromagnetic motor means, wherein said moving portion of said electromagnetic motor means comprises said armature means, wherein said non-moving portion of said electromagnetic motor means comprises said pole piece means and said tubular stationary magnetic body means, wherein said armature means is in operative abutting relationship with said pole piece means when said valving member is in said opened position, and gap means of non-magnetic material in said non-moving portion of said electromagnetic motor means for enhancing flux leakage and thereby reducing the flux decay time in said flux path loop.

In another aspect of the invention, an electromagnetic motor means comprises generally tubular stationary magnetic body means of magnetic material, pole piece means situated as to be centrally of and stationary with respect to said tubular magnetic body means, electrical coil means effective upon energization to create a magnetic field, armature means, said armature means being moved into contact with said pole piece means upon energization of said coil means, said tubular stationary magnetic body means and said pole piece means functioning to provide a magnetic flux path loop about said electrical coil means upon energization thereof, wherein said flux path loop is comprised of a non-moving portion of said electromagnetic motor means and of a moving portion of said electromagnetic motor means, wherein said moving portion of said electromagnetic motor means comprises said armature means, wherein said non-moving portion of said electromagnetic motor means comprises said pole piece means and said tubular stationary magnetic body means, and additional means forming a magnetic interruption in said non-moving portion of said electromagnetic motor means for enhancing flux leakage and thereby reducing the flux decay time in said flux path loop.

Various general and specific objects, advantages and aspects of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted from one or more views.

DETAILED DESCRIPTION OF THE PREFERRED EMBODIMENT OF THE INVENTION

Figure 1:
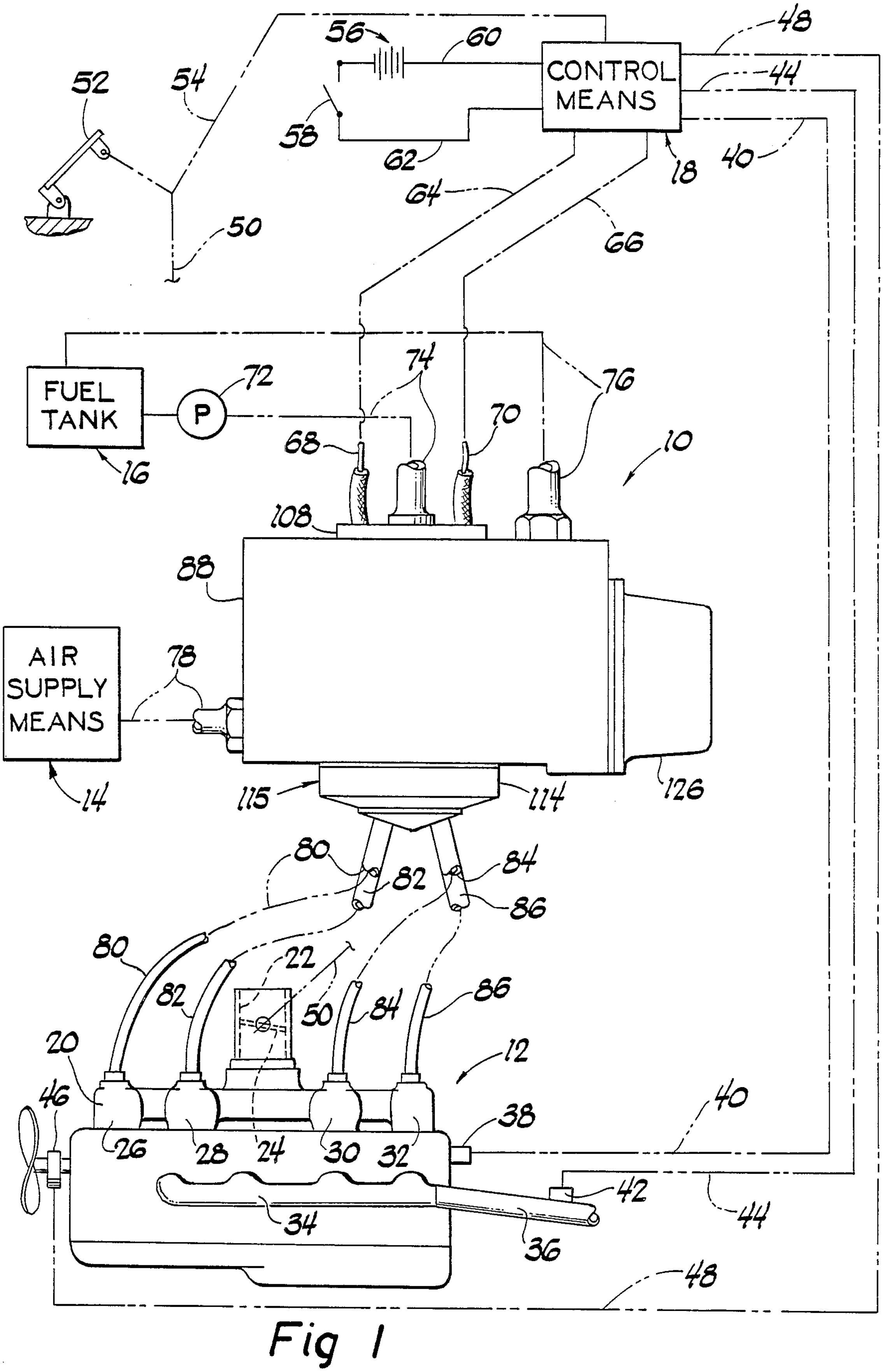
FIG. 1 is a view of a fuel metering assembly, employing teachings of the invention, along with both diagrammatically and schematically illustrated elements and components depicting, in simplified manner, an overall fuel supply and metering system for an associated combustion engine.

Referring now in greater detail to the drawings, FIG. 1 illustrates a fuel metering and delivery apparatus or system 10, a combustion engine 12, an air supply means 14, a fuel reservoir or fuel tank 16 and an associated control means 18.

The engine 12 may be provided with a manifold-like induction passage means 20 which communicates with the ambient atmosphere as by induction passage means 22 having a pivotally mounted and manually positionable throttle valve means 24 therein. An air intake cleaner, not shown but well known in the art, may be operatively connected to the intake end of induction passage means 22. In the embodiment illustrated, the engine 12 is depicted as a four cylinder engine and the induction manifold or passage means 20, as at portions 26, 28, 30 and 32, serves to communicate with the respective intake port means of the respective engine cylinders. As is well known in the art, such intake port means may be controlled by what are commonly referred to as engine intake valves which are opened and closed in timed relationship to engine operation. An engine exhaust manifold 34 communicates with the respective exhaust port means of the respective engine cylinders and with an engine exhaust pipe or conduit 36 which discharges the engine exhaust to ambient.

The control means 18 may comprise, for example, suitable electronic logic type control and power output means effective to receive one or more parameter type input signals and in response thereto produce related outputs. For example, engine temperature responsive transducer means 38 may provide a signal via transmission means 40 to control means 18 indicative of the engine temperature; sensor means 42 may sense the relative oxygen content of the engine exhaust gases (as within engine exhaust conduit means 36) and provide a signal indicative thereof via transmission means 44 to control means 18; engine speed responsive transducer means 46 may provide a signal indicative of engine speed via transmission means 48 to control means 18 while engine load, as indicated for example by the position of the engine induction system throttle valve means 24, may provide a signal as via transmission means 50 operatively connected to an engine operator's foot-actuated throttle pedal lever 52 and operatively connected as by the same transmission means or associated transmission means 54 to control means 18. A source of electrical potential 56 along with related switch means 58 may be electrically connected as by conductor means 60 and 62 to control means 18. The output terminals of control means 18 are respectively electrically connected as via conductor means 64 and 66 to electrical terminals or conductors 68 and 70, of the metering means 10, which in turn are electrically connected to opposite electrical ends of an associated electrical field generating coil means.

The fuel tank or reservoir means 16 supplies fuel to associated fuel pump means 72 (which may be situated internally of the reservoir means 16) which, in turn, supplies fuel at a superatmospheric pressure via conduit means 74 to the inlet of the metering apparatus or means 10. Outlet or return conduit means 76 serves to return excess fuel to an area upstream of the pump 72 as, for example, the fuel reservoir means 16.

The air supply means 14 serves to supply air, via conduit means 78, at a superatmospheric pressure to the metering and supply means 10.

Fuel-air emulsion transporter conduit means 80, 82, 84 and 86 serve to deliver a fuel-air emulsion from the metering means to discharge or receiving areas at least in close proximity to the respective engine cylinder intake port means situated generally in the vicinity of the induction portions 26, 28, 30 and 32.

Referring in greater detail to FIGS. 2-14, the metering assembly 10 is illustrated as comprising a main body or housing means 88 with a generally cylindrical counterbore 90 formed therein which slidably receives a generally annular end flux member or washer 92, comprised as of steel, which, in turn, is provided with a first peripheral recess which partly receives and locates an O-ring 94 which prevents fluid (in this case fuel) flow therepast.

A generally tubular shell 96 of magnetic material is closely received within the counterbore 90 and axially abuts against the upper (as viewed in FIG. 2) surface 98 of annular end member 92. The said upper surface 98 has an annular groove formed therein which partly receives and locates an O-ring 100 which serves to seal and prevent the flow of fuel therepast when the juxtaposed axial end 102 of an associated bobbin 104 is seated against surface 98.

The bobbin 104 carries a field coil means 106 which, as previously indicated, is electrically connected to the terminals or conductor means 68 and 70 (FIG. 1). The entire subassembly comprising the end member 92, shell 96, bobbin 104, coil 106, and conductor means 68 and 70 are secured within the counterbore or chamber 90 as by a suitable clamp 108 and associated suitable fastener means one of which is depicted at 110.

A guide stem and nozzle member 112 is suitably retained as within a cooperating recess, formed in body means 88, and against a cooperating housing portion 114 of what may be considered a distributor assembly 115. An O-ring seal 116, generally between the housing body means 88 and the flange-like end of member 112 serves to prevent fuel flow therepast.

A generally tubular member 118 is piloted on and movable relative to the stem portion of member 112. Generally, upon energization of the coil means 106, member 118 is caused to move upwardly (as viewed in FIG. 2) toward a pole piece-means 117 and against the resistance of spring means 119 thereby having its lower flange-like end open the previously closed fluid flow passages or nozzles formed in the guide stem and nozzle member 112.

A fuel pressure regulator assembly 120 is depicted as comprising a first chamber 122 formed in body means 88 and a second chamber 124 formed within a cover-like housing section 126 with a pressure responsive movable diaphragm or wall means 128, suitably peripherally retained, effectively separating and forming a common wall between chambers 122 and 124. A valve carrier 130 has an annular portion 132 thereof held against the chamber 122 side of diaphragm 128 while another portion 134 thereof extends through the diaphragm 128 and through a backing plate 136 to which portion 134 is suitably secured. A spring 138 has one end operatively engaged with backing plate 136 and has its opposite end operatively engaged with a spring perch member which, in turn, is preferably carried as by an adjustment screw.

The valve carrier 130 is provided with a cavity which in turn receives a ball valve member 146 which is modified to have a flatted valving surface 148. The ball valve 146 may be retained generally within the carrier cavity as by having a portion 150 of the carrier formed against ball valve 146. Further, the carrier 130 may be provided with a counterbore portion into which a compression spring 152 is fitted as to continually bear against ball valve 146 and thereby, through frictional forces, greatly minimize if not entirely eliminate any tendency of the ball valve 146 moving from its desired orientation for best seating action against the cooperating seating surface 154 of a valve seat member 156 which may have its body pressed into a passageway or conduit 158 formed in body means 88. Additional conduit means 160 serves to complete communication as between valve seat member 156, and conduit 158, and conduit means 76.

Generally, the fuel supplied via conduit means 74 flows through the annular space between the inner cylindrical surface 164 of the tubular portion 166 of bobbin 104 and the outer surfaces 161 and 162 of pole piece means 117 and member 118, as well as the inner cylindrical surface 168 of the flux-path end member 92. Such fuel as flows through such annular space eventually flows into a chamber-like portion 170 from where, as will be described in detail, it is metered to the engine. A conduit 172 communicates with chamber 170 and serves to provide for fuel flow from chamber 170 to chamber 122 where the pressure of such fuel is applied to the diaphragm or movable wall means 128. Generally, whenever the pressure of the fuel exceeds a predetermined magnitude diaphragm means 128 is moved further to the right, against the resistance of spring means 138, thereby moving the ball valve 146 in a direction away from its cooperating seating surface 154 allowing a portion of the fuel to be bypassed via valve seat 156, conduit 158, conduit 160 and return conduit means 76. Such opening and closing movements of pressure regulator valve member 146 serves to maintain a substantially constant fuel metering pressure differential.

A conduit 174, which may be formed in body means 88, receives the superatmospheric air from conduit means 78 and directs such air as to a receiving area of the distributor assembly 115.

The distributor body means 114 is depicted as comprising an upper (as viewed in FIG. 2) mounting surface means 176 which may be employed for mounting against a cooperating surface 178 of body means 88. The lower surface 188 of body means 114 may be of conical configuration with the angle of inclination thereof being, for example, in the order of 9.0° when measured from a horizontal plane or one parallel to surface means 176.

A circular recess or groove 190 is formed into body means 114 from upper surface 176 thereof so that upon securing body means 114 to housing means 88 such recess or groove 190 effectively becomes a chamber or manifold. A second groove 192 radially outwardly of groove 190 serves to retain an O-ring seal 194 which, when body 114 is secured to housing 88, creates a fluid seal therebetween.

In the embodiment disclosed, keying means are provided in order to maintain a preselected physical relationship among several of the elements and/or details. Such will be later described in greater detail; however, at this point it is sufficient merely to state that cooperating blind (closed end) holes are formed in the housing means 88 and in body 114 with cooperating keying or locating pins received by such.

In the embodiment shown four substantially equidistantly angularly spaced generally cylindrical passage means, two of which are shown at 200 and 204, are formed through body means 114 in a manner whereby, preferably, the respective axes thereof meet at a common point which also lies in a vertically extending axis 208. Further, in the embodiment disclosed, the said respective axes of the passage means, as typically depicted at 200 and 204 form an angle of substantially 9.0° with axis 208.

Figure 15:
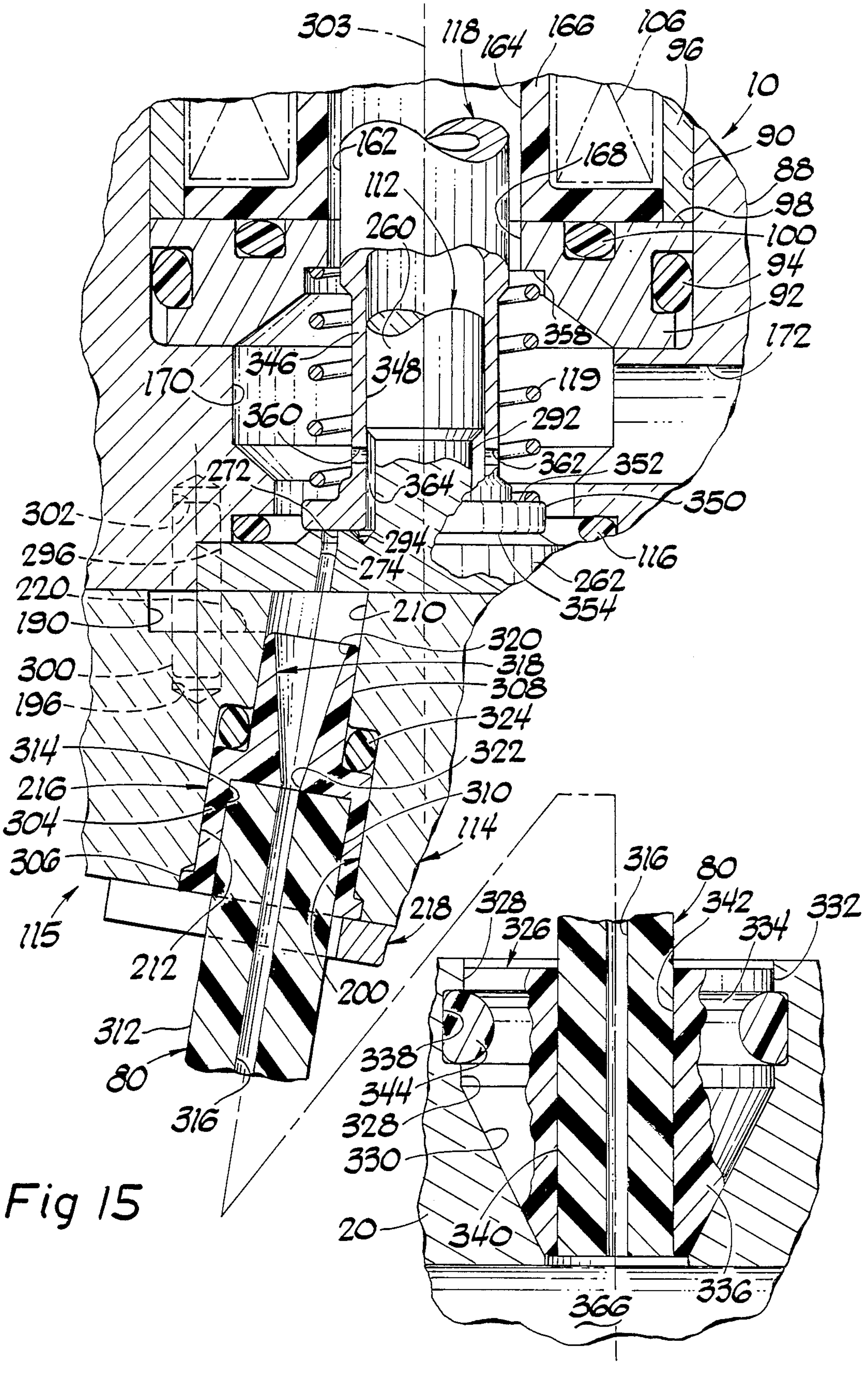
FIG. 15 is an enlarged view of a fragmentary portion of the structure of FIG. 2 as well as a fragmentary portion of the structure of FIG. 1.

As best and typically illustrated in FIG. 15 by passage means 200, each such passage means is preferably comprised of a first cylindrical passage portion 210 communicating with a serially situated relatively enlarged second cylindrical passage portion 212 and a further serially situated still further enlarged cylindrical counterbore 214.

Figure 2:
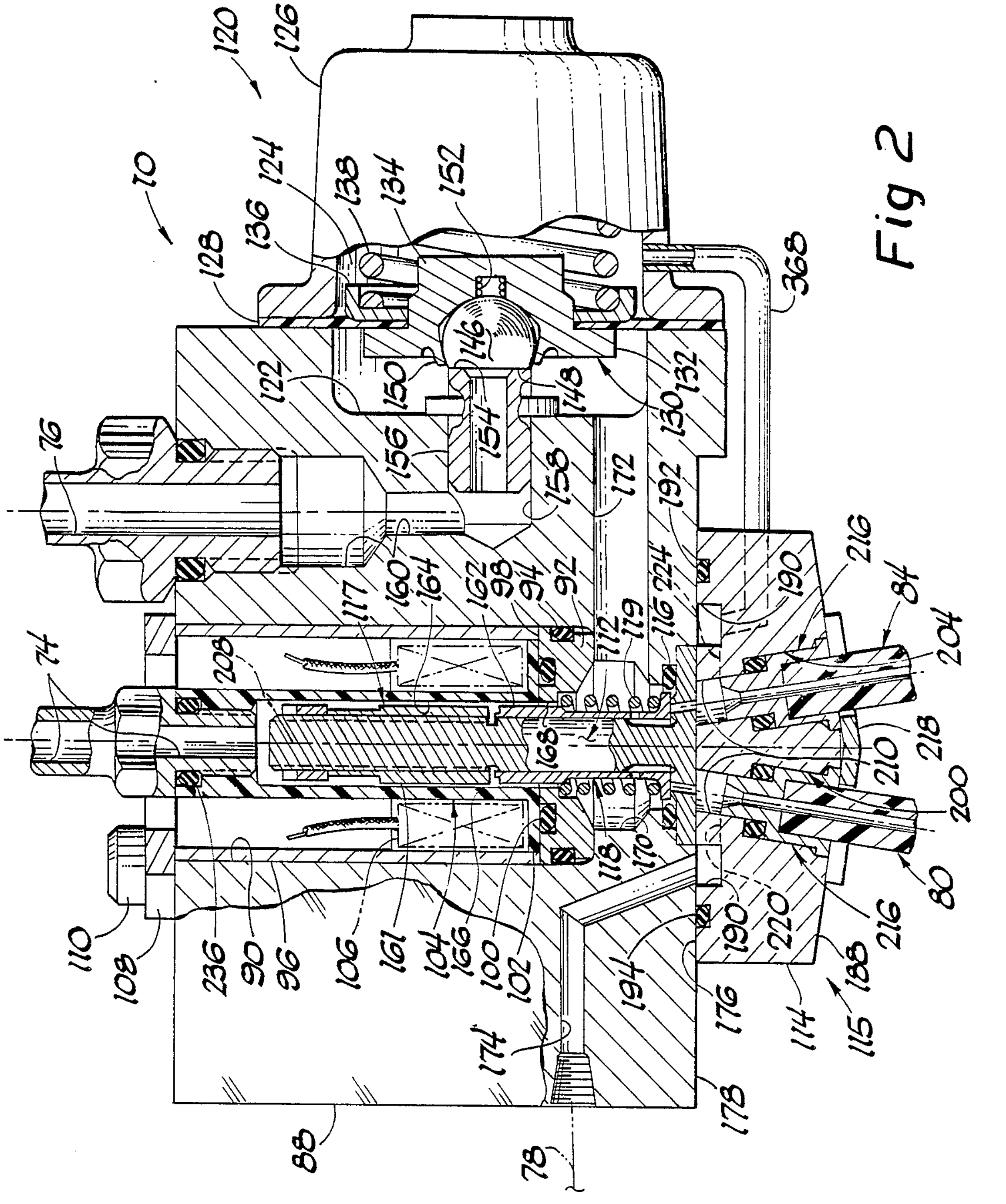
FIG. 2 is a relatively enlarged view of the fuel metering assembly of FIG. 1 with portions thereof broken away and in cross-section.

As best seen in FIGS. 2 and 15, a plurality of generally radially directed slots or recesses, two of which are typically illustrated at 220 and 224 are also formed into body 114 through surface 176 as to respectively complete communication between air distribution chamber 190 and the respective passage means, of which 200 and 204 are typical, when the body 114 is assembled to housing means 88. More particularly, such slots (functionally forming passages) 220 and 224 (and the other two which are not shown) communicate with passage means 200 and 204 (and the other two which are not shown) at and in the respective conduit portions 210 thereof.

In the embodiment illustrated, the fuel-air transport conduit means 80, 82, 84 and 86 are each provided with an end fitting 216 which is sealingly received within the respective four passage means typified by 200 and 204. When thusly received, all of the end fittings 216 may be retained assembled to body 114 as by a suitable retainer or clamping member 218.

When the distributor housing or body 114 is suitably assembled and secured to housing means 88, as generally depicted in FIG. 2, air conduit means 174 is placed in communication with air distribution chamber means 190.

Figure 4:
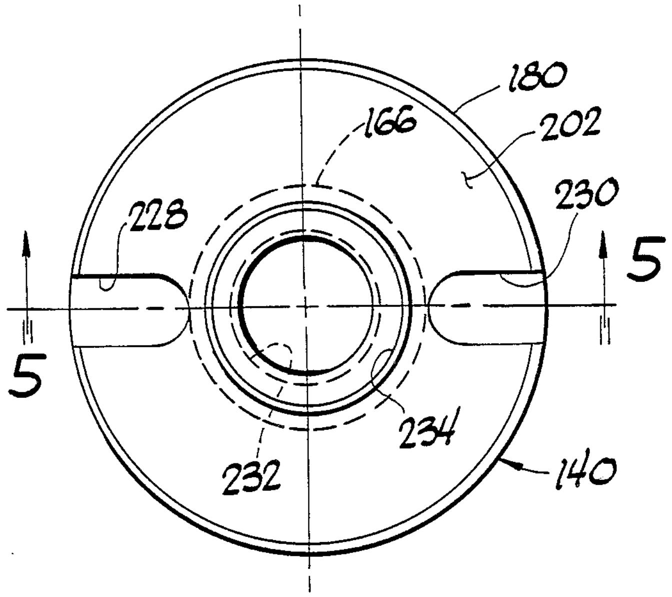
FIG. 4 is a view taken generally on the plane of line 4—4 of FIG. 3 and looking in the direction of the arrows.
Figure 3:
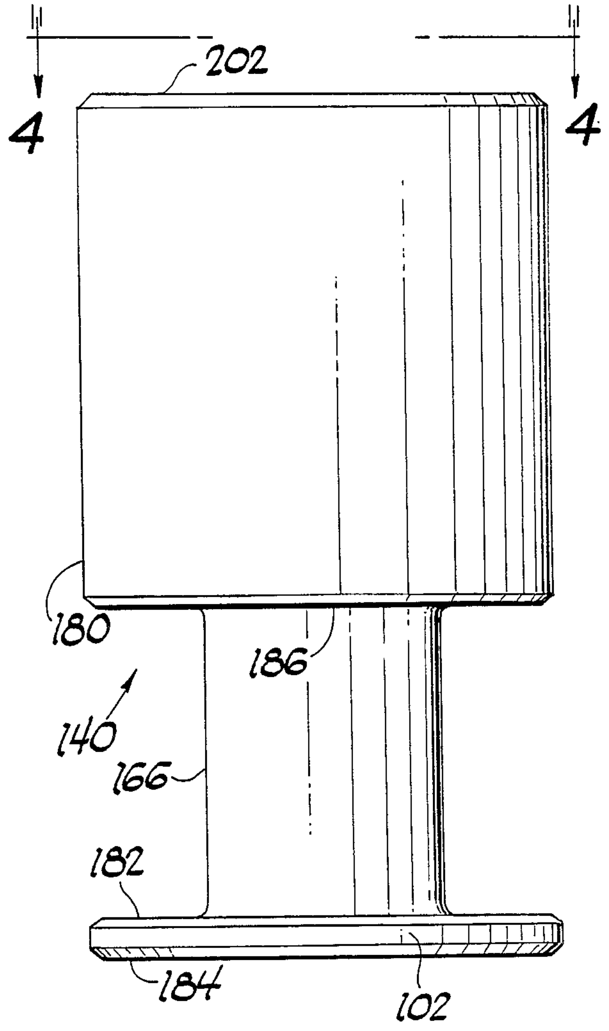
FIG. 3 is a side elevational view, in enlarged scale, of one of the elements shown in FIG. 2.
Figure 5:
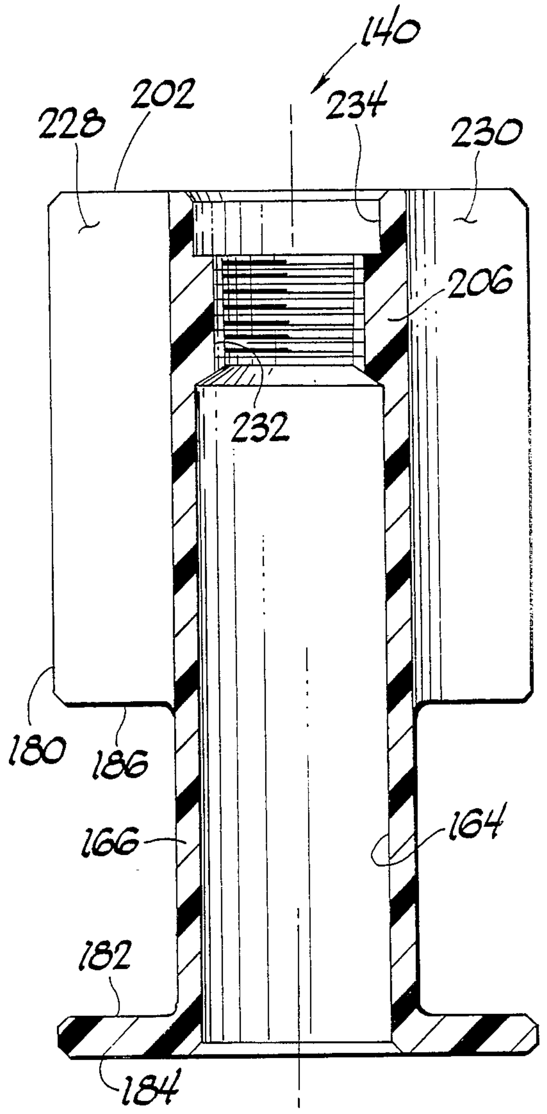
FIG. 5 is an axial cross-sectional view taken generally on the plane of line 5—5 of FIG. 4 and looking in the direction of the arrows.

Referring in greater detail to FIGS. 3, 4 and 5, the bobbin means 140 is illustrated as comprising the generally tubular portion 166 which, at its upper end, is provided with a relatively enlarged axially extending cylindrical body portion 180 and, at its lower end, is provided with a radially directed annular wall or flange 102 having an inner annular surface 182 and an outer end surface 184. The cylindrical body 180 has an inner axial face 186 and an outer or upper end face 202.

As best seen in FIGS. 4 and 5, diametrically opposite slots or clearance grooves 228 and 230 are formed axially through cylindrical body 180 as to extend from and through end surfaces 186 and 202 thereof. As depicted, the inner surface 164 comprises a cylindrical passageway which extends upwardly, from end surface 184, to a generally thickened section 206 in which an internally threaded portion 232 is formed. A generally axially aligned counterbore 234 is formed in the upper end of body 180 and is effective to receive therein an O-ring 236 (FIG. 2) when the conduit coupling 74 (FIG. 2) is threadably secured to threaded portion 232. The field coil 106 is wound generally about tubular portion 166 as to be axially contained between opposed end surfaces 182 and 186 and the electrical conductors or leads from such coil 106 extend through the clearance slots or grooves 228 and 230.

The bobbin means 140 is formed of non-magnetic material and, in the preferred embodiment, is preferably formed of nylon.

Referring in greater detail to FIGS. 6-9, the guide stem and nozzle means 112 which, for example, may be formed of stainless steel, is illustrated as comprising a generally lower cylindrical guide stem portion 260 integrally formed with a disk-like nozzle head portion 262 and an upper threaded portion 238. Preferably, the threaded portion 238 and cylindrical portion 260 are axially separated by a cylindrically necked-down portion 240. The nozzle body portion 262 has, generally, two body thicknesses; that is a generally radially outer portion 264 is of relatively reduced thickness while the radially inner portion 266 is of relatively increased thickness. In the preferred embodiment, nozzle body portions 264 and 266 are blended to each other as by an inclined or conical-like surface 268 which is inclined toward the central axis 270 in the order of 45°.

A circular groove or recess 272 is formed into portion 266 as to have its axis generally colinear with axis 270 and as to have its upper end (as viewed in FIG. 8) open. A plurality of fuel nozzles or passages 274, 276, 278 and 280 are formed in head portion 262 so as to have the respective upper ends (as viewed in FIG. 8) thereof in communication with the fuel distribution ring 272 and as to have the respective lower ends 284, 286, 288 and 290 thereof opening at the lower end surface 282 of head portion 262.

Figure 8:
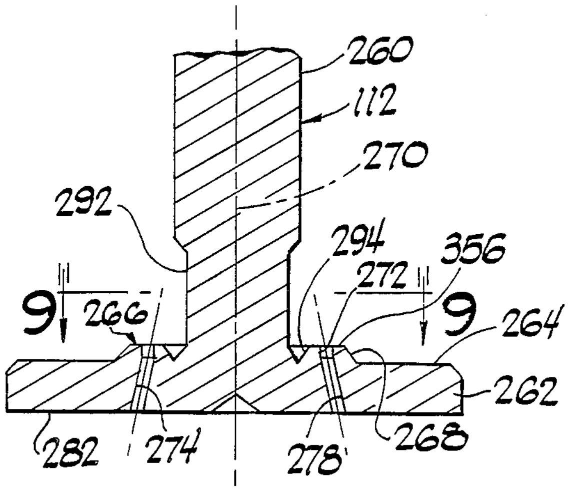
FIG. 8 is a fragmentary axial cross-sectional view taken generally on the plane of line 8—8 of FIG. 7 and looking in the direction of the arrows.
Figure 9:
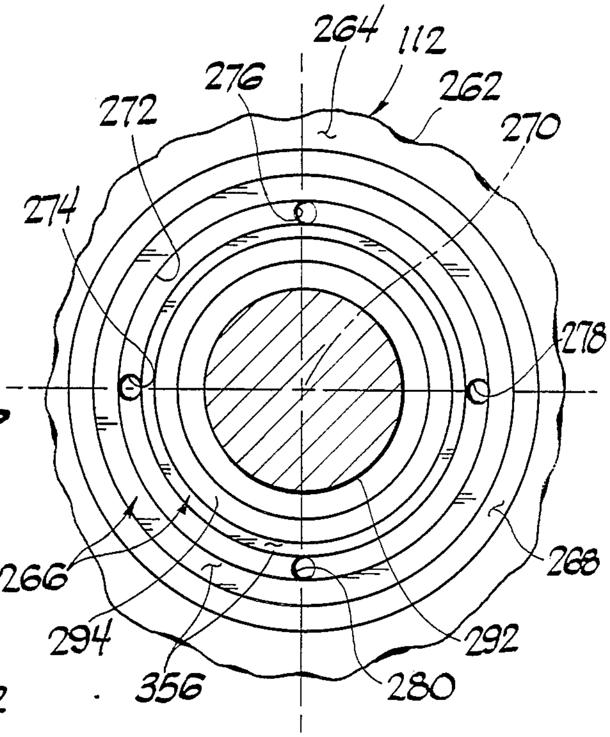
FIG. 9 is an enlarged view of a fragmentary portion of the structure of FIG. 8 taken generally on the plane of line 9—9 of FIG. 8 and looking in the direction of the arrows.

In the embodiment disclosed, there are four of such fuel nozzles 274, 276, 278 and 280 which, as viewed in FIG. 9, are angularly spaced at 90° about the fuel manifold or distribution means 272 and, as viewed in FIG. 8, are each inclined as to have the respective axes thereof inclined 9.0° with respect to the central axis 270.

Figure 6:
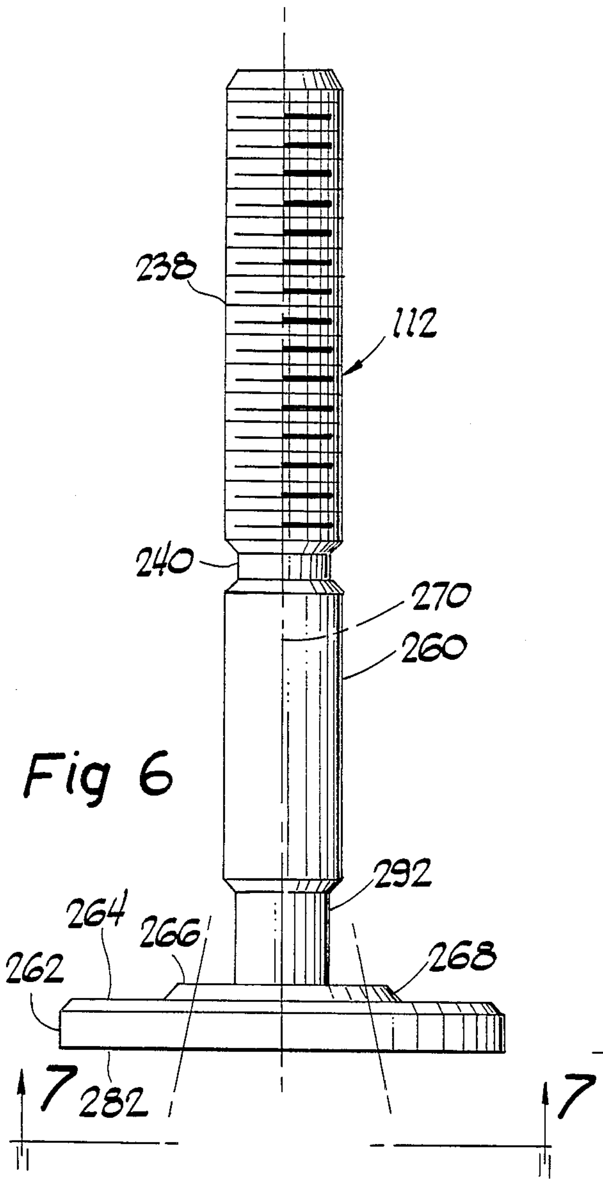
FIG. 6 is a side elevational view, in enlarged scale, of another of the elements shown in FIG. 2.

As seen in both FIGS. 2, 6 and 8, the guide stem portion 260 has a cylindrical portion 292 of reduced diameter as at its lower end. A V-like circular groove 294 is formed in the head portion 266 as to be generally adjacent cylindrical portion 292 and spaced radially inwardly of fuel manifold means 272.

Figure 7:
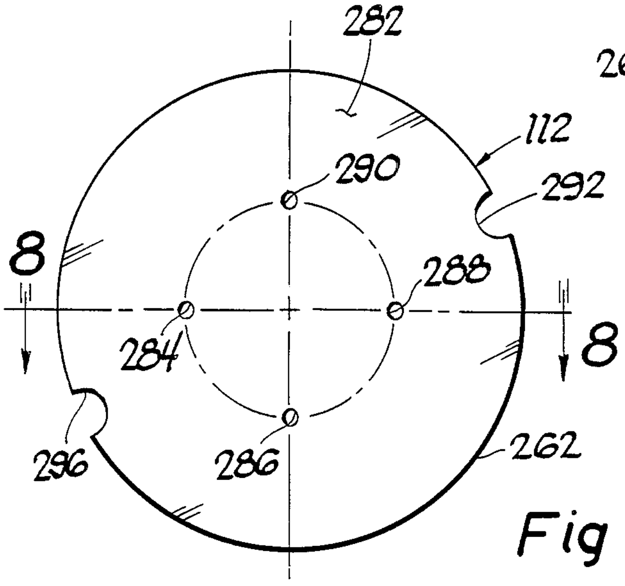
FIG. 7 is a view taken generally on the plane of line 7—7 of FIG. 6 and looking in the direction of the arrows.

As best seen in FIG. 7, diametrically opposite situated keying slots or recesses 296 and 298 are formed in nozzle head 262 for cooperation with the keying pins previously referred-to.

Figure 11:
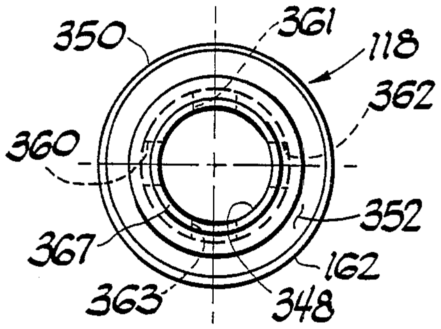
FIG. 11 is a view taken generally on the plane of line 11—11 of FIG. 10 and looking in the direction of the arrows.
Figure 10:
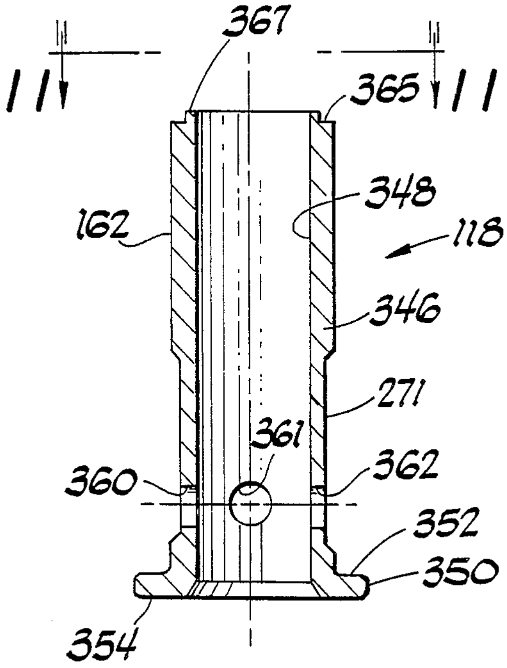
FIG. 10 is an axial cross-sectional view, in enlarged scale, of another element shown in FIG. 2.

FIGS. 10 and 11 illustrate the valving member 118 as comprising a tubular axially extending body 346 of which the inner cylindrical surface 348 is closely slidably piloted on and movable with respect to the guide stem portion 260 of member 112. At its lower end (as viewed in FIG. 10) the valving member 118 has an integrally formed radially outwardly extending annular flange 350 having an upper surface 352, against which one end of spring 119 is engageable as shown in FIG. 2, and a lower surface 354 which serves as a valving surface when brought against the surfaces 356 (see FIGS. 8 and 9) effectively surrounding the fuel distribution passage or groove 272. The tubular body 346 may be provided with an axially extending portion 271 of reduced outer diameter and have a plurality of holes or passages 360, 361, 362 and 363 formed through the wall of the tubular member 118 generally near the lower end thereof. Preferably, the upper (as viewed in FIG. 10) end of valve member 118 is formed with an annular stepped portion 365 resulting in a ring-like axial extension 367. The member 118 is formed of magnetic material and as will become apparent serves not only as a valving member but also functions as the armature means.

Figure 13:
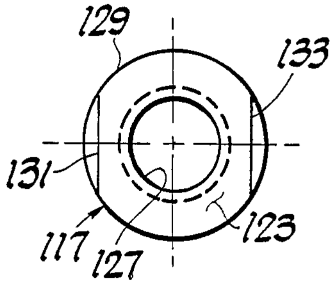
FIG. 13 is a view taken generally on the plane of line 13—13 of FIG. 12 and looking in the direction of the arrows.
Figure 12:
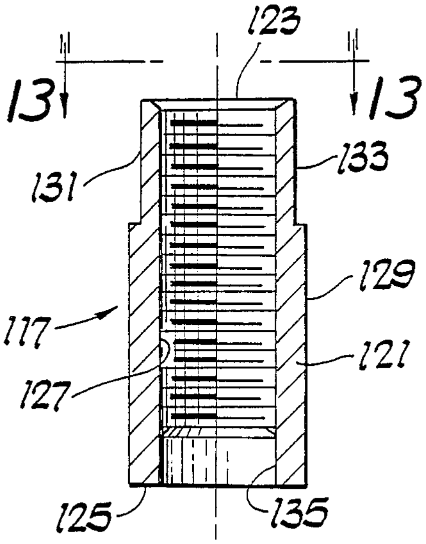
FIG. 12 is an axial cross-sectional view, in enlarged scale, of another element shown in FIG. 2.

FIGS. 12 and 13 illustrate the pole piece means 117 as comprising a cylindrically tubular body 121 having upper and lower (as viewed in FIG. 12) ends 123 and 125 and an internally threaded portion 127. At its upper portion, the outer cylindrical surface 129 has flatted surfaces 131 and 133 formed therein which serve as tool engaging surface means. Preferably an axially extending counterbore 135 is formed in the lower end of body 121. The pole piece 117 is also formed of magnetic material.

Figure 14:
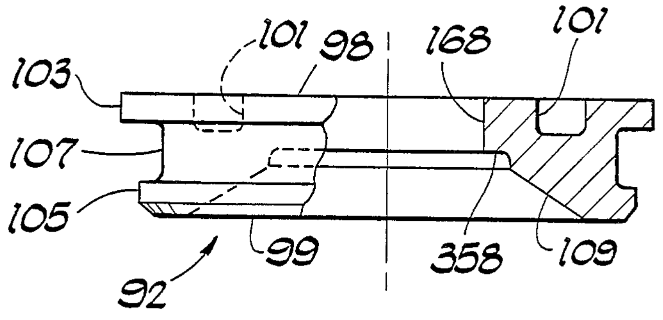
FIG. 14 is a view mostly in axial cross-section and with a portion thereof in elevation, in enlarged scale, of another element shown in FIG. 2.

FIG. 14 illustrates the flux end member or washer 92, which is formed of magnetic material, as being of a generally annular configuration having upper and lower (as viewed in FIG. 14) axial end surfaces 98 and 99 with an annular groove 101 formed into the upper surface for retaining the O-ring 100 (shown in FIG. 2). The upper surface 98 operatively abuts with the magnetic shell 96 and the end flange 102 of bobbin means 104 while the lower surface 99 operatively abuts against a cooperating surface of housing means 88. Axially spaced cylindrical portions 103 and 105 define a generally circumferential groove 107 which serves to retain the O-ring 94 (FIG. 2). A radiating shoulder-like surface 358 serves as a spring perch for spring means 119 while a generally conical surface 109 opens into chamber 170 of housing 88 (FIG. 2).

Referring in greater detail to FIG. 15 wherein only one of the plurality of fuel-air transporter tubes or conduit means is shown and considered, one of two keying pins 300 (shown out of position for purposes of clarity) is depicted in hidden line as being pressed into a blind hole 196 of distributor body 114, engaging the keying recess 296 of nozzle head 262 and also pressed into an aligned blind hole 302 formed in housing means 88. A like or similar keying arrangement, not shown, is comprised of keying recess 298 of nozzle head 262, blind holes equivalent to 198 and 302 and a keying or locating pin as that shown at 300. When the elements are assembled as depicted in FIGS. 15 and 2, the axes of the elements in FIGS. 3–14 may be considered as forming a single axis 303.

As typically depicted in FIG. 15, the end fittings 216, preferably formed of a plastic material such as, for example, nylon, is preferably comprised of a generally cup-shaped main body portion 304 having a radiating flange portion 306 at its fully open end and a generally cylindrical axially extending body portion 308, of relatively reduced diameter. One end portion 310 of a tubular conduit member 312 is suitably received and contained, as well as retained, with the interior 314 of the cup-shaped main body portion 304. A flow passage 316 through conduit member 312 is thusly placed in alignment with a generally conical passage 318 formed within body portion 308 as to have its outer open end 320 directed toward the associated fuel nozzle (in this case nozzle 274) and tapering as to have its inner most end 322 of a reduced cross-sectional flow area generally equal to the cross-sectional flow area of flow passage 316. In the preferred embodiment, the tubular conduit member 312 is formed of plastic material such as, for example, "Teflon". "Teflon" is a trademark, of the DuPont de Nemours, E. I. & Co. of Wilmington, De. United States of America, for materials of tetrafluoroethylene fluorocarbon polymers. Further, during manufacture the end fitting 216 may be molded directly onto the end of tubular conduit member 312 thereby simultaneously joining such and sealing against any flow therebetween. When the fitting 216 and associated tubular member are assembled to the distributor body means 114, the end fitting 116 is closely received with passage or conduit sections 210 and 212 while the flange 306 is forced generally inwardly, by suitable clamp or retaining means 218, into the counterbore 214. A suitable O-ring seal 324 is generally contained and compressed as between juxtaposed shoulders of fitting 216 and the passage means (in this case passage means 200).

As also typically illustrated in FIG. 15 each of the fuel-air transporter tubes or conduits, in this case 80, preferably comprises a discharge end fitting 326 which is suitably secured to the engine induction system as in, for example, the engine intake manifold means 20.

In the embodiment disclosed, the intake manifold 20 (which, of course, is simplistically illustrated and may be comprised of any desired configuration having respective runners extending to the fuel discharge and receiving areas 26, 28, 30 and 32) is formed with a cylindrical bore 328 and an inwardly extending and inwardly tapering conical-like passage 330 extending therefrom and opening into the interior of the induction passage wherein the discharge of fuel is desired as in close proximity to the engine intake port or valve means.

As depicted, the discharge end fitting 326, typically, may comprise a first upper disposed generally cylindrical body portion 332, provided with a circumferentially extending groove 334, and an integrally formed downwardly depending inwardly tapering generally conical body portion 336. An annular radially outwardly extending groove or recess 338 is formed in the wall of cylindrical bore 328 as to be in general juxtaposition to groove 334 when end fitting 326 is seated as illustrated.

In the preferred embodiment, the discharge end fitting is formed of a plastic material, such as, for example, "Teflon" and, further, is molded directly onto a discharge end portion 340 as of tubular member 312 thereby both retaining such end portion 340 and effectively sealing against flow as between end portion 340 and the juxtaposed inner portion 342 of fitting 326. An O-ring 344 carried as by groove or recess 338 serves to effectively lock and hold the end fitting 326 in assembled relationship with the induction structure 20 as by becoming received in both recesses 338 and 334 when the fitting 326 is seated. Such O-ring 344 also serves to seal against any flow therepast.

As already mentioned, valving member 118 is also the armature so that upon energization of the coil means 106 the valving member 118 is caused to move upwardly (as viewed in FIGS. 2 and 15) against the resilient resistance of spring 119 thereby opening the fuel distribution ring 272 to the pressure regulated superatmospheric fuel in chamber means 170 and causing fuel to be metered through nozzle means 274, 276, 278 and 280 with such being respectively discharged at ports 284, 286, 288 and 290 (also see FIG. 7). As should be evident, passage means 360, 361, 362 and 363, of which 360 and 362 are shown in FIG. 15, serve to complete free communication as between chamber means 170 (radially outwardly of armature valving means 118) and the annular space 364 existing between the inner cylindrical surface 348 of armature valving member 118 and cylindrical portion 292 of stem and nozzle means 112. As is clearly shown in FIG. 15, such annular space 364 is in communication with the circular groove or recess 294.

Operation of the Invention

The rate of metered fuel flow, in the embodiment disclosed, will be principally dependent upon the relative percentage of time, during an arbitrary cycle time or elapsed time, that the valve member 118 is relatively close to or seated against seating surface means 356 of the nozzle body portion 262 as compared to the percentage of time that the valve member 118 is opened or away from the cooperating seating surface means 356.

This is dependent upon the output to coil means 106 from the control means 18 which, in turn, is dependent upon the various parameter signals received by the control means 18. For example, if the oxygen sensor and transducer means 42 senses the need of a further fuel enrichment in the motive fluid being supplied to the engine and transmits a signal reflective thereof to the control means 18, the control means 18, in turn, will require that the metering valve 118 be opened a greater percentage of time as to provide the necessary increased rate of metered fuel flow. Accordingly, it will be understood that given any selected parameters and/or indicia of engine operation and/or ambient conditions, the control means 18 will respond to the signals generated thereby and respond as by providing appropriate energization and de-energization of coil means 106 (causing corresponding movement of valve member 118) thereby achieving the then required metered rate of fuel flow to the engine 12.

More particularly, assuming that the coil means 106 is in its de-energized state, spring 119 will urge valve member 118 downwardly, along the guide stem portion 260, causing the lower axial end face or valving surface 354 thereof to sealingly seat against the cooperating seating surface means 356 of nozzle body 262 thereby preventing fuel flow from chamber 170 into fuel distribution ring 272.

When coil means 106 becomes energized a magnetic flux is generated and such flux includes armature valving member 118 which reacts by being drawn upwardly along guide stem portion 260, against the resistance of spring 119, until such armature valving member 118 operatively abuts against the pole piece means 117 which determines the total stroke or travel of the armature valving member 118. Such total stroke or travel of armature valving member 118, from its seated or closed position to its fully opened position against said related stop means, may be, for example, in the order of 0.05 mm. It should be clear that during the entire opening stroke as well as during the entire closing stroke, the valving member 118 is guided on stem portion 260.

During engine operation, which may include engine cranking, pressurized air is supplied to conduit means 174 by the source 14. The air thusly supplied is directed to the air distribution chamber means 190 generally circumscribing the four passage means of which 200 and 204 are shown. The respective interconnecting passages, of which 220 and 224 are shown serve to convey the pressurized air from distribution chamber 190 to the respective passage means as 200 and 204 where it flows into the generally conical opening 318 of each of the end fittings 216. At the same time the valving member 118 is rapidly being cyclically opened and closed and during the time that it is opened, the pressurized fuel within chamber 170 is metered as solid fuel through each of the nozzles 274, 276, 278 and 280. The fuel as is metered through said nozzles 274, 276, 278 and 280 emerges from outlet or discharge orifices 284, 286, 288 and 290 in a path and direction ideally colinear with the respective axes of nozzles 274, 276, 278 and 280 which, in turn, are ideally respectively colinear with the axes of the end fitting chambers 318 in the passage means as 200 and 204.

As can be seen, especially with reference to FIG. 15, the thusly supplied pressurized air and the metered fuel discharged from the metering nozzle or passage (typically illustrated by 274) both flow in the same direction toward and into conical chamber 318 which effectively functions as a collecting and/or mixing chamber means. That is, the metered fuel and air flowing into chamber means 318 are effectively collected by such chamber means 318 and experience some degree of intermixing as the resulting stream of commingled fuel and air flows axially along and within chamber means 318 toward flow passage 316. This flow of commingled fuel and air may be considered as an emulsion of fuel and air with the air serving as the principal medium for transporting the fuel along or through the transporter passage 316 and to the point of ultimate discharge to the engine as at receiving area 366.

In the disclosed embodiment, the operating pressure of the air supplied to the air distribution means may be, for example, in the range of 15.0 to 40.0 p.s.i.g. (at standard conditions) while the magnitude of the regulated pressure of the fuel in chamber means 170 may be in the order of an additional 1.0 atmosphere differential with respect to the then existing pressure of the air supplied by means 14. The cross-sectional diameter of (each) transporter passage 316 may be in the order of 0.80 to 1.50 mm. In one successfully tested embodiment, the cross-sectional diameter of the transporter passage 316 was in the order of 0.85 mm. and the cross-sectional diameter of each of the fuel nozzles (one shown at 274) was in the order of 0.50 mm.

Because of the relatively high magnitude of air pressure supplied by means 14, there is always a high speed flow through the respective transporter passages 316 resulting not only in the fuel-air emulsion being transported therethrough but also causing the fuel-air emulsion to undergo at least two flow phases resulting in a continuing mixing action of such fuel-air emulsion as it flows to be discharged into the receiving area 366. As a consequence of such high speed flow, flow-phase changes and continued mixing of the fuel-air emulsion the mean fuel droplet size, at the point of discharge of the fuel-air emulsion to the engine, may be as low as 10–30 microns with the result that such small fuel droplet size greatly reduces the emissions of the engine under lean (in terms of fuel) operating conditions.

Further, in the preferred embodiment, the volume rate of flow of air supplied by air supply means 14 to the transporter tubes or conduit means 80, 82, 84 and 86 is one-half to one-third less than that required to sustain idle engine operation. The air provided by means 14 is only for the purpose of transportation, emulsification and break-down of fuel droplet size as is delivered to the designated receiving area of the engine. The balance of the air required to not only sustain engine idle operation but for all conditions of engine operation is provided by the variably openable and closable throttle valve means, simplistically illustrated at 24 of FIG. 1, which controls the air flow as to the engine induction means 20.

Still with reference primarily to FIG. 15, it can be seen that in the embodiment illustrated the pressurized fuel not only fills annular chamber 364 but also fills the circular recess or groove 294 which is in direct communication with chamber 364 even when armature valve member 118 is in its seated closed condition or position against cooperating seating surface means 356 (FIG. 8). This enables fuel to flow from two radial directions toward the fuel distribution ring or channel 272 whenever metering valve member 118 is moved to an open position. More particularly, when armature metering valve member 118 is moved upwardly (as viewed in FIGS. 2 and 15) to an open position, the pressurized fuel in channel 294 quickly flows radially outwardly, between juxtaposed surface 354 of metering valve 118 and surface means 356 of nozzle head 262, toward the circular channel or groove 272; simultaneously, the fuel in chamber 170, generally radially outwardly of, for example, surface 268 (FIG. 12), quickly flows radially inwardly between juxtaposed surfaces 354 and 356 toward the same circular channel or groove 272. In this way the entire fuel distribution channel 272 is assured of being filled and acted upon by the pressure of the fuel within chamber 170 every time that valve member 118 is moved toward an open position.

It should be apparent that FIG. 15 is intended, among other things, to disclose and illustrate a typical arrangement of a fuel transporter conduit means as singly depicted by 80. In the embodiment as depicted in FIG. 1 (of which FIG. 15 is an enlarged fragmentary portion in cross-section) four transporter conduit means 80, 82, 84 and 86 are depicted with such transporter conduit means respectively communicating with spaced fuel-receiving areas of the engine 12. The remaining transporter conduit means 82, 84 and 86 would be as transporter conduit means 80 and, further, respectively communicate with nozzle means 276, 278 and 280 as well as with the air distribution chamber means 190 via passages 222, 224 and 226, respectively. The fuel-air emulsion created, the fuel-air emulsion flow phases referred to, the continuing mixing of the fuel-air emulsion and the size of the fuel droplets discharged to the engine as described with reference to transporter conduit means 80 apply equally well to the remaining transporter conduit means 82, 84 and 86. Further, it should be evident that the invention could be practiced in combination with any other engine requiring, for example, five, six eight or any number of such transporter conduit means for supplying fuel to its respective engine combustion chambers.

It should be pointed-out that optimum results are obtained if all of the fuel-air emulsion transporter conduit means are of substantially equal effective length while being as short as possible commensurate with the existing conditions.

The invention, provides, among other things, a single fuel metering valve member effective for metering fuel to a plurality of spaced fuel-receiving areas or ports of an engine and does it in a manner whereby, tests have shown that a fuel-delivery variation of less than two percent exists as between any two of the transporter conduit means and that in comparison to conventional prior art multipoint fuel injection systems an engine provided with a fuel metering and delivery system of the invention produces at least the same torque and exhibits improved fuel economy, cold and hot engine cranking performance and overall drivability, reduced engine exhaust emissions and a significantly increased lean (fuel) burn range of operation.

Further, in the preferred embodiment, the existing magnitude of the pressurized air supplied as to the air distributor 190, and therefore the pressure of the air provided to the respective four passage means, of which only 200 and 204 are shown, is communicated to the fuel pressure regulator chamber 124 as to thereby have the pressure differential across the diaphragm means 128 that of the metering pressure differential across the nozzle or metering port means 274, 276, 278 and 280. In this way the fuel metering differential will remain substantially constant regardless of changes in the magnitude of the air pressure supplied to the air distribution chamber means 190. Although such communication of air pressure to regulator chamber 124 may be accomplished by any suitable means as, for example, by conduitry formed generally internally of housing means 88 and cover 126 which may, in fact, communicate as with the discharge end of conduit 174, such communication is depicted, especially for purposes of clarity, by a conduit means 368 situated generally externally and having one end communicating with chamber 124 and having a second end communicating with air distribution chamber means 190.

Figure 16:
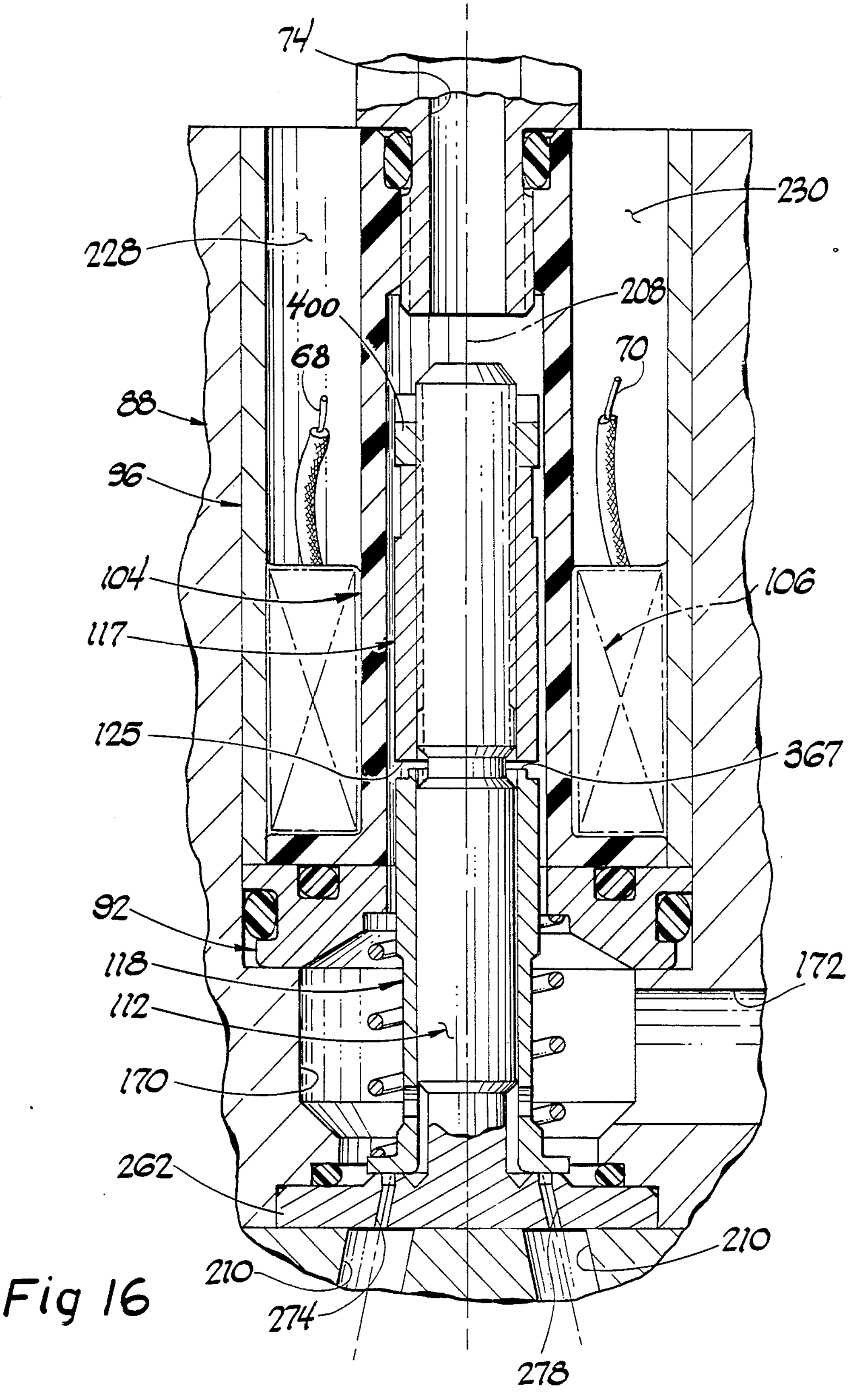
FIG. 16 is an enlarged view of a fragmentary portion of the structure of FIG. 2.

In the electromagnetic motor means or valving assembly, as shown in relatively enlarged scale in FIG. 16, the armature means 118, of magnetic material, is closely piloted on the stem and guide means 112 for movement in the axial direction of axis 208 as well as being free to rotate thereabout. The pole piece means 117 is threadably secured to the stem and guide means 112 and adjusted axially as to provide the desired gap as between opposed surfaces 125 and 367 of the pole piece 117 and armature means 118, respectively. As shown in, for example, both FIGS. 2 and 16, a suitable locking nut 400 is also threadably engaged with stem and guide means 112 and locked against the upper end of pole piece means 117 (after the pole piece means has been adjusted to provide the desired gap) to thereby secure the pole piece 117 in its adjusted calibrated position. It is also contemplated that the upper portion of the stem and guide means 112 may be formed without threaded portion 238 (FIG. 6) and that the pole piece 117 press-fitted thereon to its calibrated position. It is further contemplated that only a relatively short axial length of the upper portion of the stem and guide means 112 be threaded and that the pole piece 117, in the main, be press-fitted onto the non-threaded portion and yet operatively engaged with the threaded portion thereby enabling axial adjustment of the pole piece means 117 by threadable rotation thereof. In such a contemplated arrangement a lock nut as 400 could also be provided.

Figure 17:
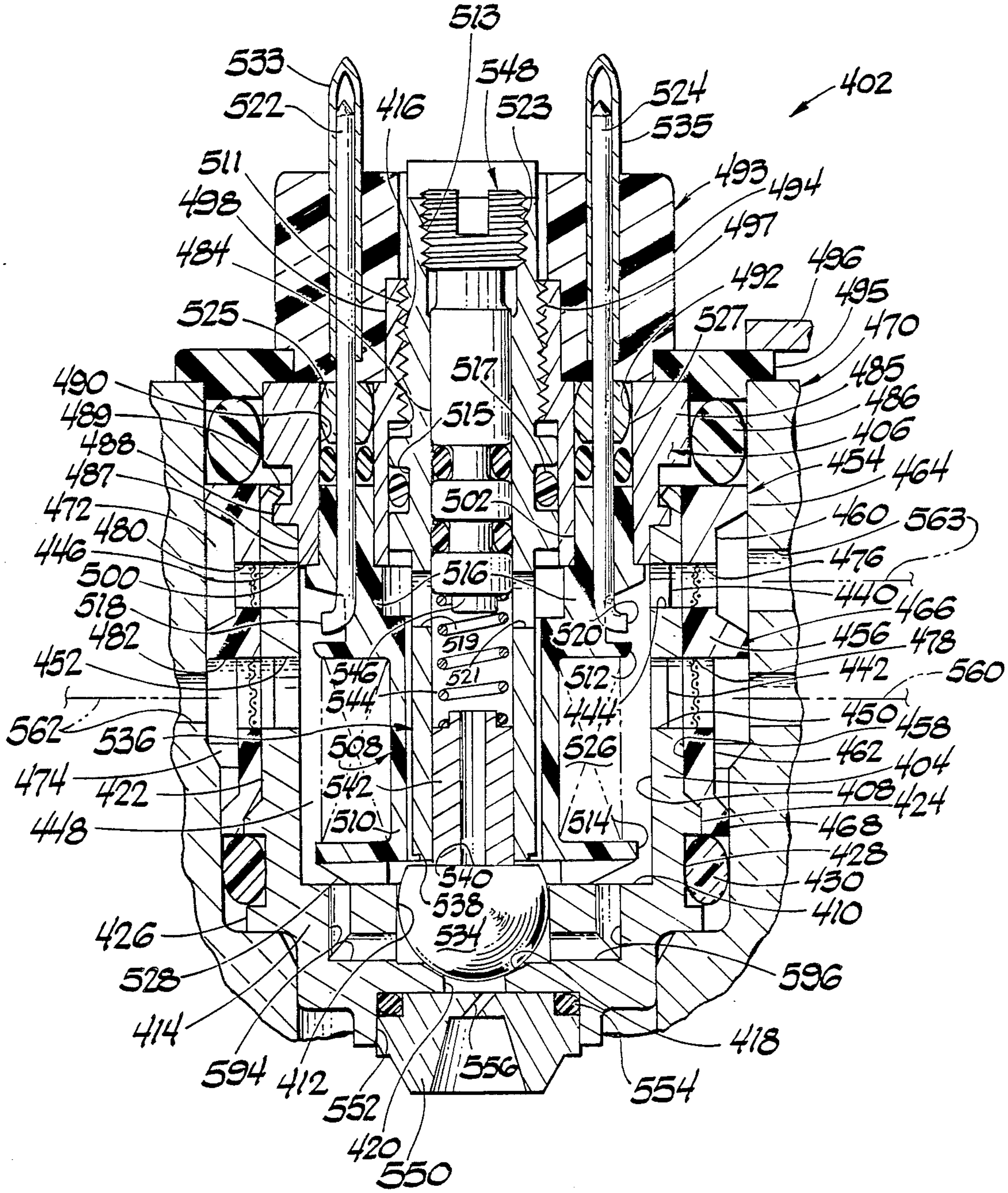
FIG. 17 is an axial cross-sectional view of another embodiment of an electromagnetic fluid metering valving assembly employing teachings of the invention.

FIG. 17 illustrates another electromagnetic motor means 400 in the form of an electromagnetic fuel metering valving assembly. The assembly 400 is illustrated as comprising a generally tubular cup-shaped main body or housing means 404 of magnetic material which is open at its upper end as to receive, generally therein, an inner support body 406 of non-magnetic material.

As generally depicted, the housing means 404 is preferably provided with an axially extending inner cylindrical surface 408 which may terminate as in an annular flange-like or shoulder surface 410 which is directed radially inwardly from the inner cylindrical surface 408. A counter-bore or axially extending recess 412 is formed in the lower transverse axial end wall portion 414 of housing means 404. Although other configurations of valve seating surface means are, of course, possible, in the embodiment illustrated a conical seating surface means 418 is formed in the lower axial end wall 414 and communicates with an outlet passage means 420 also formed in said end wall 414.

The external surface 422 of housing means 404 is also of a generally cylindrical configuration and, among other things, is provided with annular flange-like portions 424 and 426 which cooperate to define an annular recess 428 which, in turn, is effective for receiving and holding an O-ring seal 430. Housing means 404 is also preferably provided with a plurality of axially spaced circumscribing annular recesses 440 and 442 formed in the outer cylindrical surface thereof. A first plurality of generally radially directed angularly spaced apertures or passages, two of which are shown at 444 and 446, are formed through housing 404 and serve to complete communication as between annular recess 440 and the interior 448 of housing or body means 404. A second plurality of generally radially directed angularly spaced apertures or passages, two of which are shown at 450 and 452, are formed through housing 404 and serve to complete communication as between annular recess 442 and the interior 448 of housing or body means 404.

A filter assembly 454 is illustrated as being comprised of a generally tubular body 456 of cylindrical configuration having its inner cylindrical surface 458 received at least closely against the outer surface 422 of housing means 404. Preferably, the body 456 is comprised of 33.0% glass-filled nylon resin. The upper end (as viewed in FIG. 17) of filter body 456 is open as to permit, for example, the reception therethrough of the housing means 404. Filter body 456 is also preferably provided with a plurality of axially spaced circumscribing annular recesses 460 and 462 formed in the outer cylindrical surface thereof thereby defining annular flange-like portions 464, 466 and 468. When received within related support structure 470, a first annular chamber or passage 472 is formed generally by recess 460, flanges 464 and 466 and the interior of the support structure 470; similarly a second annular chamber or passage 474 is formed generally by recess 462, flanges 466 and 468 and the interior of the support structure 470.

A first plurality of generally radially directed angularly spaced apertures or passages, two of which are shown at 476 and 480, are formed through filter body 456 and serve to complete communication as between annular passage 472 and annular recess or passage 440. A second plurality of generally radially directed angularly spaced apertures or passages, two of which are shown at 478 and 482, are formed through filter body 456 and serve to complete communication as between annular passage 474 and annular recess or passage 450. The plurality of passages, as typified by passages 476 and 480, are respectively provided with filter screen means as are the plurality of passages, as typified by passages 478 and 482.

The support body 406 is generally tubular having a centrally disposed internally threaded portion 416 and an aligned bore 484 of relatively increased diameter. A first flange-like portion 485 cooperates as with the interior of structure 470 to sealingly contain an O-ring 486. A pilot-like outer surface 487 is closely received by the interior surface 408 of magnetic body means 404 and a second flange-like portion 488 has a portion 489 of magnetic body means 404 spun or suitably formed over it as to thereby fixedly secure the support body 406 in assembled relationship to magnetic body means 404. Further, support body 406 is provided with cylindrical passages 490 and 492 formed therethrough.

A cover-like dielectric member 493, has an axially extending cylindrical body portion 494 and an annular flange portion 495 which axially collectively abut against the structure 470 and support body 406. Suitable clamping or retainer means, as fragmentarily illustrated at 496, may be provided to maintain the assembly 402 in assembled relationship to structure 470. Dielectric body 494 is also provided as with a counterbore 497 to accommodate the axial extension 498 of support body 406.

A non-magnetic bobbin 508 is depicted as comprising a centrally disposed tubular portion 510 with axially spaced radially extending end walls 512 and 514 along with a generally upwardly projecting annular portion 516 which, among other things is operatively structurally connected to respective one ends 518 and 520 of electrical terminals 522 and 524. A pair of generally cylindrically tubular extensions 500 and 502, formed integrally with annular portion 516, serve to receive therethrough electrical terminals 522 and 524 and, in turn, are received within passages 490 and 492, respectively. A field coil 526 is wound generally about tubular portion 510 and axially contained between end walls 512 and 514. The ends of the wire forming the electrical coil 526 are electrically connected to ends 518 and 520, respectively, of electrical terminals 522 and 524. In the preferred embodiment a plurality of foot-like portions 528 are carried by the end wall 514 of bobbin 508 and are preferably angularly spaced about the axis of tubular portion 510 and, further, function as abutment means for axially abutting against the surface 410.

A generally tubular pole piece 536 extends downwardly into the tubular portion 510 of bobbin 508 and is preferably provided with a stepped annular pole piece end face 538 which may be spaced from a flatted surface 540 of the depicted ball valve member 534, when such ball valve member is against seating surface means 418, in the order of, for example, 0.002 to 0.005 inch. The pole piece 536 may be of generally cylindrically tubular configuration having a generally upper disposed externally threaded portion 511, which coacts with threaded portion 416 of support body 406, and a further internally threaded portion 513. A cylindrically enlarged portion, generally axially medially of the pole piece means 536, is slidably received in the counterbore 484 of support body 406 and is provided with a generally peripheral groove or recess 515 which sealingly contains an O-ring 517. A plurality of apertures or passages, two of which are shown at 519 and 521, are formed through the wall of pole piece means 536 as to thereby complete communication as between the inner bore of pole piece means 536 and the interior of magnetic body or housing means 404. The desired gap between juxtaposed surfaces 538 and 540, during when armature valve 534 is closed against seating surface means 418, is established as by the threadable rotation of pole piece means 536 within coacting threaded portion 416 of non-magnetic support body means 406.

A tubular guide pin 542, of preferably non-magnetic stainless steel, is slidably received with the core or pole piece means 536 and is normally resiliently urged downwardly (as viewed in FIG. 17) against valve 534 to urge said valve member into seated engagement with the associated seating surface means 418.

A spring 544 received as within the bore of pole piece means 536 is axially contained between and against the guide pin 542 and one end 546 of a spring adjuster screw 548 which at its upper end is provided with an externally threaded portion 523 threadably engaged with threaded portion 513 of pole piece means 536 and is suitably sealed as by O-rings to prevent leakage therepast as is well known in the art. The purpose of such spring adjuster screw 548 is, of course, as is well known in the art, to attain the desired spring pre-load on guide pin 542 and valve 534.

A suitable nozzle-like fuel discharge member or insert 550 may be received in a bore 552 formed in end wall 414 of housing 404 and suitably secured therein. Suitable O-ring means 554 may be provided to prevent leakage between nozzle insert 550 and bore 552. Further, suitable metered fuel discharge orifice means 556 may be provided as to flow the metered liquid, in this case fuel, to the related metered fuel receiving area of the engine induction system.

A pair of conductor guides or alignment members 525 and 527 may be respectively received in passages 490 and 492 and, as depicted, further O-ring seals may be provided about the conductors 522 and 524 generally between the alignment members and the tubular cylindrical extensions 500 and 502.

The associated support structure 470 is provided with conduit means 560, 562 and 563 with: (a) conduit means 560 serving to communicate between annular recess or passage 474 and associated fuel pump means; (b) conduit means 562 serving to communicate between annular recess or passage 474 and associated fuel pressure regulating means; and (c) conduit means 563 serving to communicate between annular passage or recess 472 and an associated fuel reservoir or fuel tank.

In one successful embodiment of the invention of FIG. 17 the diameter of the ball valve member 534 was 0.2810 inch while the diameter of bore 412 was manufactured to a dimension of 0.2815/0.2820 inch thereby resulting in a minimum diametrical clearance (between the ball valve 534 and bore 412) of 0.0005 inch and a maximum diametrical clearance of 0.0010 inch. For all practical purposes this can be considered as having the valve 534 touching the surface of bore 412.

In the preferred embodiment, the valve member 534 may be formed of 52100 Grade chrome steel and such are readily commercially available to very exacting dimensional requirements. Further, as should be now clearly apparent, the valve member 534 also acts as the armature means in the overall injector assembly 402.

In the embodiment of FIG. 17, the conductors 522 and 524, along with respective electrically conductive sleeve members 533 and 535, each bedded in dielectric body 494, are respectively functionally equivalent to conductor means 68 and 70 of FIG. 1 and may be connected to the associated control means 18 shown therein for operation as described with reference to FIGS. 1 and 2.

In FIG. 17, the associated fuel pump means supplies fuel under superatmospheric pressure via conduit means 560 to annular chamber 474 from where such fuel flows through the plurality of ports or passages 478 and 482 (which may be only two of many), through the filter means and into annulus 442 of housing means 404 from where, in turn, such fuel flows into the interior space 448 as via the plurality of ports or passages 450 and 452 (which also may be only two of many). Any excess fuel is returned to the fuel reservoir or tank as via conduit means 562, communicating with annulus 474, which is serially connected to suitable pressure regulating means and return conduit means leading to the fuel reservoir. Any fuel vapors which may occur within the assembly 402 are permitted to flow out and return as to the fuel tank as via conduit means 563 which may contain series situated calibrated restriction means (not shown).

The fuel under superatmospheric pressure thusly provided to cavity or space 448 of course also flows through the spaces between the plurality of legs 528 and through the plurality of passages or conduits formed generally in end wall 414, two of which are shown at 594 and 596, into chamber or bore 412. As the armature valve 534 is moved upwardly off its cooperating seat 418, fuel passes between the opened valve 534 and seat 418 and into passage 420 from where it is discharged as via nozzle discharge passage means 556 into the engine induction system.

In accordance with FIG. 1, the terminal means 522 and 524 may be respectively electrically connected as via suitable conductor means to related electronic control means 18 and, as should already be apparent, the metering means 402 is of the duty-cycle type wherein the winding or coil means 526 is intermittently energized thereby causing, during such energization, armature valve member 534 to move in a direction away from valve seat 418. Consequently, the effective flow area of the flow orifice thusly cooperatively defined by the armature valve member 534 and valve seat 418 can be variably and controllably determined by controlling the frequency and/or duration of the energization of coil means 526.

The control means 18, as previously described, may comprise, for example, suitable electronic logic type control and power output means effective to receive one or more parameter type input signals and in response thereto produce related outputs to the conductors or terminals 522 and 524.

As with the embodiment of FIGS. 1–16, the rate of metered fuel flow, in the FIG. 17 embodiment, will be dependent upon the relative percentage of time, during an arbitrary cycle time or elapsed time, that the valve member 534 is relatively close to or seated against seat 418 as compared to the percentage of time that the valve member 534 is opened or away from the cooperating valve seat 418. This, of course, is dependent on the output to coil means 526 from control means 18 which, in turn, is dependent on the various parameter signals received by the control means 18.

More particularly, assuming that the coil means 526 is in its de-energized state, spring 544 will urge the guide pin 542 (which is axially slidable within core or pole piece means 536) downwardly causing the lower axial end face of the guide pin 542 to urge against the flatted surface 540 of armature valve 534 and hold the valve 534 in a sealed seating engagement with seat means 418 thereby preventing fuel flow therepast into conduit 420.

When coil means 526 becomes energized a magnetic flux is generated and such flux path includes armature valve 534 and core, pole piece means 536 and magnetic body means 404. As a consequence of such flux field, armature valve 534 is drawn upwardly pushing with it the guide pin 542 against the resilient resistance of spring means 544. Such upward movement of the armature valve 534 continues until the flatted surface 540 of armature valve 534 abuts against pole piece end face means 538. Such total stroke or travel of valve member 534, from its seated or closed position to its fully opened position against pole piece means 536, 538, may be, for example, in the order of 0.005 inch. It should be clear that during the entire opening stroke as well as during the entire closing stroke, the valve member 534 is guided within and by bore or guide passage 412.

When the energization of field coil means 526 is terminated, spring 544, through guide pin 542, moves valve member 534 downwardly through its down stroke until the valve 534 is sealingly seated against cooperating seating surface means 418.

Figure 18:
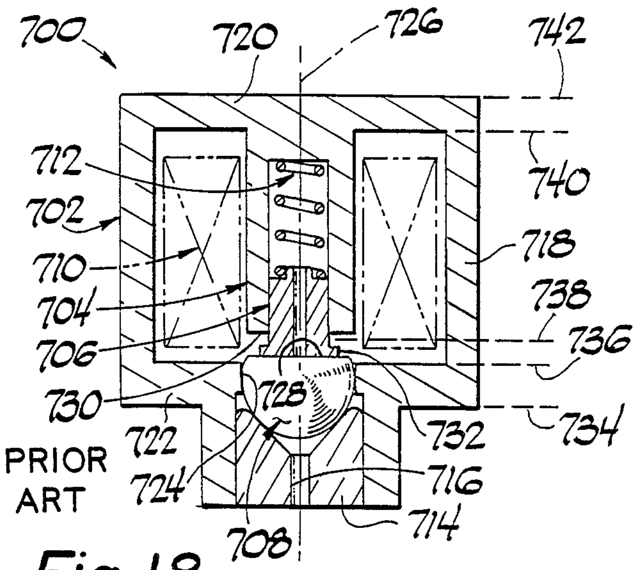
FIG. 18 is an axial cross-sectional view, in simplified form, of an electromagnetic fluid metering valving assembly of the prior art.

FIG. 18 is a simplified axial cross-sectional view of a prior art electromagnetic motor assembly, in the form of a fuel metering and injector valving assembly. Various details which are known in the art, such as a fuel inlet, bobbin structure, seals, etc. are not shown since such are neither germane nor needed to understand the following description relative thereto.

With particular reference to FIG. 18, the prior art electromagnetic assembly 700 is illustrated as comprising, typically, a magnetic body or housing means 702, pole piece means 704, guide member 706, armature-valve 708, electrically energizable coil means 710, return spring 712 and valve seat member 714 with liquid discharge passage means 716 formed therethrough. The magnetic body means 702 is of cylindrical configuration having a magnetic annular side wall 718 and a magnetic upper or top wall 720 circular in outer configuration. In practice, the top wall 720 may actually be a separate magnetic member (or members) suitably connected and secured to the annular side wall 718. Similarly, the pole piece means 704 may be, for example, integrally formed with the top wall 720 or suitably connected and secured thereto. The lower wall 722 of magnetic body means 702 is also of magnetic material and circular in outer configuration. It is not uncommon practice, especially when spherical type armature-valves are employed, to form a bore or guide passage means 724 generally in the lower wall portion 722. As typified by bore 724, such are usually of a diametrical dimension extremely close to the spherical diameter of the valve member, as 708. Therefore, for all practical purposes when such spherical type valves are employed in a guide bore means, typified by 724, the valve may be considered as touching the juxtaposed surface of the guide bore.

Generally, in the prior art structures as exemplified in FIG. 18, when the coil means 710 is in a de-energized state, the spring 712, through the axially movable guide member 706, urges and maintains the valve member 708 closed against the cooperating seat means 714 as depicted. When the coil means 710 becomes energized a magnetic flux is generated and such flux path forms a generally closed magnetic loop of a torus-like configuration about the coil means 710. More particularly, when viewed in the plane of the drawing of FIG. 18, and first considering the side thereof to the right of the central axis 726, such closed magnetic loop flux path would pass upwardly (for purposes of reference and description) through the pole piece 704, into the top wall 720 moving rightwardly toward and into side wall 718 and downwardly thereof into bottom or lower wall 722 and leftwardly thereof into armature-valve 708 and, from the flatted surface 728 of valve 708, into end face 730 of pole piece means 704. Similarly, considering the side to the left of axis 726, the closed magnetic loop flux path would lie as in a pattern extending upwardly through the pole piece 704, into the top wall 720 and then leftwardly to side wall 718 and downwardly thereof to bottom wall 722 and rightwardly therealong to armature-valve 708 and, from the flatted surface 728 to end face 730 of the pole piece 704.

Of course, as a consequence of such flux path and field, armature-valve 708 is drawn upwardly against the resilient resistance of spring 712, through the guide pin or member 706. Such upward movement of the armature-valve 708 continues until the annular flange 732 (or other suitable abutment means) of guide pin means 706 abuts against pole piece end 730. Such flange 732, in the prior art, serves to establish an air gap, between the armature 708 and pole piece 704, which, in turn, is intended to decrease the release or closing time of the valve upon de-energization of the coil means. Some prior art structures, in an attempt to provide for such a gap between the cooperating armature and pole piece faces have plated or otherwise coated one or more of such surfaces as with a non-magnetic material. However, neither of such methods (that is, some spacer means as a flange or non-magnetic shim material or coating with a non-magnetic material) have produced satisfactory release and closing times of the armature.

Figure 20:
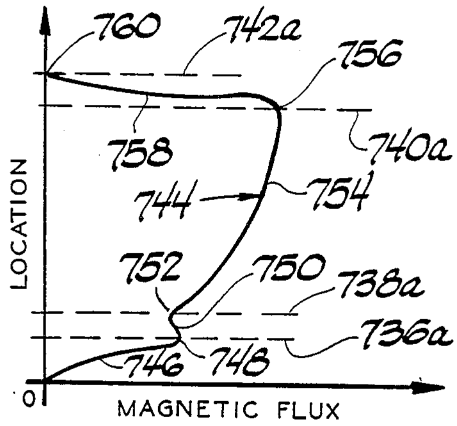
FIG. 20 is a graph illustrating the relationship of flux density compared to its location within the depicted prior art structure of FIG. 18.

The dash lines 734, 736, 738, 740 and 742 of FIG. 18 are intended to represent certain elevations or imaginary reference planes passing through the prior art structure 700. In the graph of FIG. 20, the dash lines 736*a*, 738*a*, 740*a* and 742*a* are intended to respectively correspond to the elevations or imaginary reference planes 736, 738, 740 and 742 of FIG. 18. The horizontal axis of the graph of FIG. 20 corresponds to the imaginary reference plane 734 of FIG. 18 while the vertical axis may be regarded as an indication of the relative locations of such imaginary planes along the effective axial length of the magnetic body means 702 of FIG. 18. Further, the horizontal axis, as it extends to the right, indicates increasing values of the flux density within the structure of FIG. 18.

A study of the flux density curve 744 of FIG. 20 will show that with the coil means 710 energized the flux density at level or location 734 is, for all practical purposes of zero magnitude and that such flux density increases along curve portion 746 to an increased value at level or location 736, as depicted at point 748, from where the flux density decreases along curve portion 750 to a reduced value at level or location 738, as depicted at point 752. Next, the flux density again increases along curve portion 754 until it reaches a maximum value at level or location 740 as depicted at point 756. Finally, the flux density decreases along curve portion 758 until at level or location 742 it reaches a value generally equal to zero as depicted at point 760.

Figure 19:
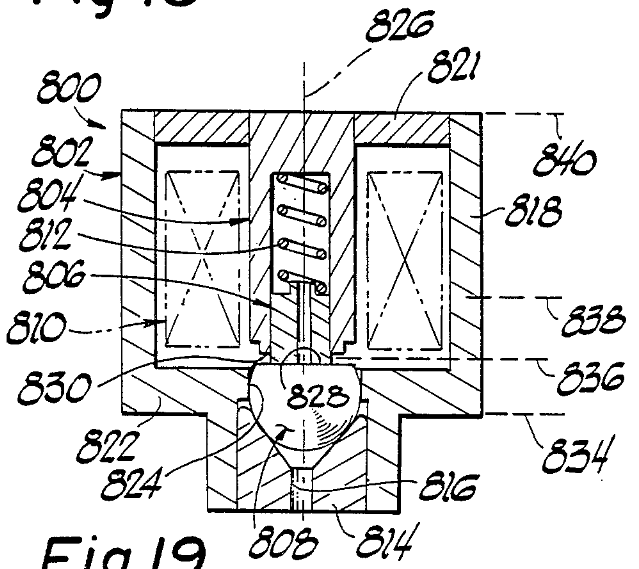
FIG. 19 is an axial cross-sectional view, in simplified form, of an electromagnetic fluid metering valving assembly employing teachings of the invention.

FIG. 19 is a simplified axial cross-sectional view of an electromagnetic motor assembly, employing teachings of the invention and taking the form of a fuel metering and injector valving assembly. Various details which are known in the art, such as a fuel inlet, bobbin structure, seals etc. are not shown since such are neither germane nor needed to understand the following description relative to FIG. 19.

With particular reference to FIG. 19, the electromagnetic assembly 800 is illustrated as comprising a magnetic body or housing means 802, pole piece means 804, guide pin or member 806, armature-valve 808, electrically energizable coil means 810, return spring 812 and valve seat member 814 with liquid discharge passage means 816 formed therethrough. The magnetic body means 802 is of cylindrical configuration having a magnetic annular side wall 818. A top wall 821 of non-magnetic material, which is depicted as being circular in outer configuration, is operatively connected and secured to the upper end of annular side wall 818. The pole piece 804 of magnetic material is suitably secured to and carried by the top wall 821. The lower wall 822 of magnetic body means 802 is also of magnetic material and circular in outer configuration. As in the embodiment of FIG. 18, a bore or guide passage means 824 is formed generally in the lower wall portion 822. Further, as is often the case, the bore 824 is of a diametrical dimension extremely close to the spherical diameter of the valve member, as 808. Therefore, for all practical purposes when such spherical type valves are employed in a guide bore means, as 824, the valve member may be considered as touching the juxtaposed surface of guide bore.

When the coil means 810 is in a de-energized state, the spring 812, through the axially movable guide member 806, urges and maintains the valve member 808 closed against the cooperating seat means 814 as depicted. When the coil means 810 becomes energized a magnetic flux is generated and such flux path forms a magnetic loop of torus-like configuration about coil means 810. However, to distinguish such magnetic loop from the closed magnetic loop described with reference to the prior art as typified in FIG. 18, the magnetic loop of the structure of FIG. 19 may be considered as an open magnetic loop. More particularly, when viewed in the plane of the drawing of FIG. 19, and first considering the side thereof to the right of the central axis 826, such magnetic flux path would pass upwardly (for purposes of reference and description) through the pole piece 804 and extend beyond the non-magnetic top wall 821 while also directed rightwardly, in a curvilinear manner, to the side wall 818 downwardly thereof into bottom or lower wall 822 and leftwardly thereof into armature-valve 808 and, from the flatted surface of valve 808, into end face 830 of pole piece means 804. Similarly, considering the side to the left of axis 826, the magnetic flux path would lie as in a pattern extending upwardly through the pole piece 804 and extend beyond the non-magnetic top wall 821 while also directed leftwardly, in a curvilinear manner, to the side wall 818 downwardly thereof into bottom or lower wall 822 and rightwardly thereof into armature-valve 808 and, from the flatted surface of valve 808, into end face 830 of pole piece means 804.

As a consequence of such flux path and field, armature-valve 808 is drawn upwardly against the resilient resistance of spring 812, through guide pin or member 806. Such pull-in or upward movement of the armature-valve 808 continues until the flatted surface 828 of armature-valve 808 engages and abuts against the juxtaposed pole piece means end face 830. As should now be noted, the gap between the pole piece end face and the armature-valve member as produced by the flange 732 of the prior art structure of FIG. 18 does not exist in the embodiment of FIG. 19 when the armature-valve 808 is fully pulled-in or, in this case, fully opened. Further, it should be stressed that the flux density at the top of the assembly 800 is significantly less than that of assembly 700 of FIG. 18 and such is due to the elimination of a top wall of magnetic material (as 720 of FIG. 18) and the replacement thereof with a supporting wall structure 821 of non-magnetic material. Accordingly, if the top end wall and side wall along with the pole piece of an electromagnetic assembly are first established as being, for purposes of reference and definition, the stationary portion of such electromagnetic assembly, while the armature and lower end wall are defined as being the moving portion of such electromagnetic assembly, then it becomes evident that in the prior art, as exemplified by the structure of FIG. 18, a magnetic closed loop exists in such stationary portion; however, in comparison, in electromagnetic assemblies employing teachings of the invention, a magnetic open loop, for the flux path, exists in the stationary portion thereof. In the embodiment of FIG. 19, the depicted annular top wall 821 is of non-magnetic material thereby resulting in an increase in or an enhanced flux leakage in such area with a consequent reduction in flux density. The provision of such non-magnetic material in the stationary portion of electromagnetic body means results in such a herein defined magnetic open loop flux path. Further, such provision of non-magnetic material in the stationary portion of electromagnetic body means creates what may be defined as an interruption or discontinuity in the flux path of such stationary portion.

Figure 21:
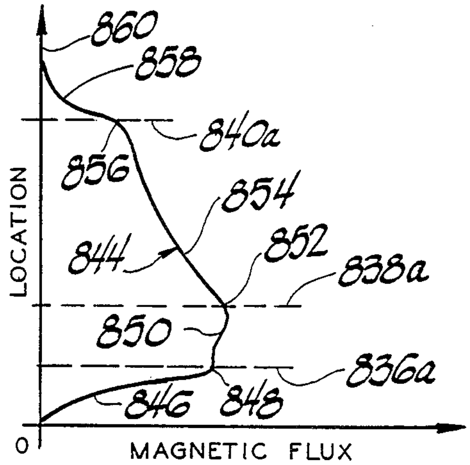
FIG. 21 is a graph illustrating the relationship of flux density compared to its location within the depicted structure of FIG. 19.

The dash lines 834, 836, 838 and 840 of FIG. 19 are intended to represent certain elevations or imaginary reference planes passing through the structure 800. In the graph of FIG. 21, the dash lines 834*a*, 836*a*, 838*a* and 840*a* are intended to respectively correspond to the elevations or imaginary reference planes 834, 836, 838 and 840 of FIG. 19. The horizontal axis of the graph of FIG. 21 corresponds to the imaginary reference plane 834 of FIG. 19 while the vertical axis may be regarded as an indication of the relative locations of such imaginary planes along the effective axial length of the magnetic body means 802 of FIG. 19. Further, the horizontal axis, as it extends to the right, indicates increasing values of the flux density within the structure of FIG. 19.

A study of the flux density curve 844 of FIG. 21 will show that with the coil means 810 energized the flux density at level or location 834 is, for all practical purposes, of zero magnitude and that such flux density increases along curve portion 846 to an increased value at level or location 836, as depicted at point 848, from where the flux may at first slightly decrease but in the main increases along curve portion 850 until it reaches a maximum value at level or location 838 as depicted at point 852. Next, the flux density decreases along curve portion 854 until it reaches a substantially reduced value at level or location 840 as depicted at point 856. Finally, the flux density further decreases along curve portion 858 until, at some level or location spaced beyond level or location 840, it reaches a value generally equal to zero as depicted at point 860.

In comparing the graphs of FIGS. 20 and 21 it becomes evident that the magnetic closed loop of the prior art produces a very high flux density as from point 752 to point 756 and that upon de-energization of the field coil means the decay time is much longer than the decay time of the inventive structure as graphically represented in FIG. 21. Further, in comparing the graphs of FIGS. 20 and 21 it can be seen that in the inventive structure the flux density reaches a substantially greater magnitude at point 848 than at the comparable point 748 of FIG. 20 thereby reducing the pull-in time of the armature. Such graphs of FIGS. 20 and 21 graphically illustrate the discovery that by providing a magnetic open loop, in the stationary portion of the electromagnetic assembly, which stationary portion is geometrically one of a configuration of revolution about its axis, that: (a) a flux density of increased magnitude, as compared to the prior art, is developed in the area where it is most needed to achieve pull-in of the armature; (b) that such increased magnitude of flux density is attained substantially quicker than what is attained by the prior art and (c) that the magnitude of the flux density in the remaining portion of the said stationary portion is substantially reduced, as compared to the prior art, thereby dramatically reducing the flux decay time, upon de-energization of the field coil means, enabling the quicker return stroke of the armature, as valve 808 to its closed or seated position. As a consequence of this, electromagnetic assemblies of the invention have substantially quicker opening times, pull-in time of the armature, and substantially quicker closing times (release or return of the armature) as compared to the known best embodiments of the prior art.

Figure 22:
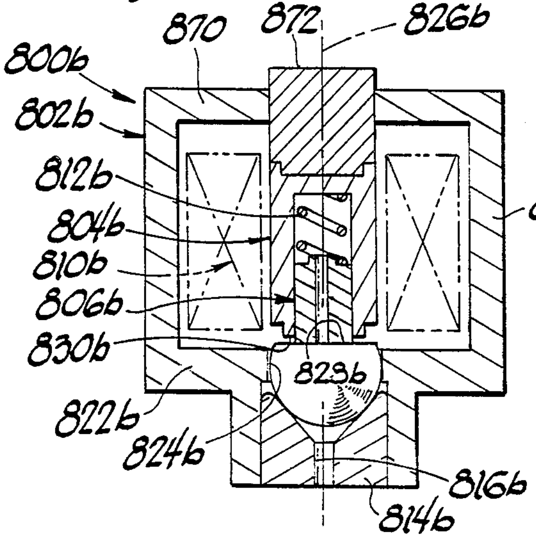
FIG. 22 is an axial cross-sectional view, in simplified form, of another electromagnetic fluid valving assembly employing teachings of the invention.

In FIG. 22 all elements which are like or similar to those of FIG. 19 are identified with like reference numbers provided with a suffix "b". Unless specifically noted to the contrary, the operation of the structure of FIG. 22 is as described with reference to FIG. 19 and the characteristic flux density thereof is as represented in and discussed with reference to FIG. 21.

In comparing the structures of FIGS. 22 and 19, it can be seen that the structure of FIG. 22 is provided with an upper wall 870 of magnetic material and that such upper wall is of circular outer configuration at least operatively joined to the cylindrical side wall **818*b*. In the embodiment of FIG. 22 the inventive magnetic open loop characteristic is achieved by a support means 872 of non-magnetic material for supporting the pole piece means 804*b*. The juxtaposed axial ends of the support means 872 and pole piece means 804*b* may be secured to each other by any suitable means as, for example, by brazing. In the embodiment of FIG. 22, the non-magnetic support 827 is shown as extending through the upper or top wall 870 and, in such an arrangement it is contemplated that the non-magnetic support 872 and upper wall 870 may be provided with respective threaded portions for coaction to axially adjust the position of the pole piece means 804*b*. It is further contemplated that the embodiment of FIG. 22 may be modified by having the upper wall 870 continuous and, instead, suitably operatively securing the non-magnetic support means 872 to the inner side or portion of such magnetic upper wall 870**.

In either event, the embodiment depicted or contemplated in FIG. 22 provides for the inventive magnetic open loop or magnetically interrupted loop by means of a gap of non-magnetic material in the stationary portion of the electromagnetic assembly **800*b*; in this instance the gap of non-magnetic material takes the form of support means 872 for the pole piece means 804*b***.

Figure 23:
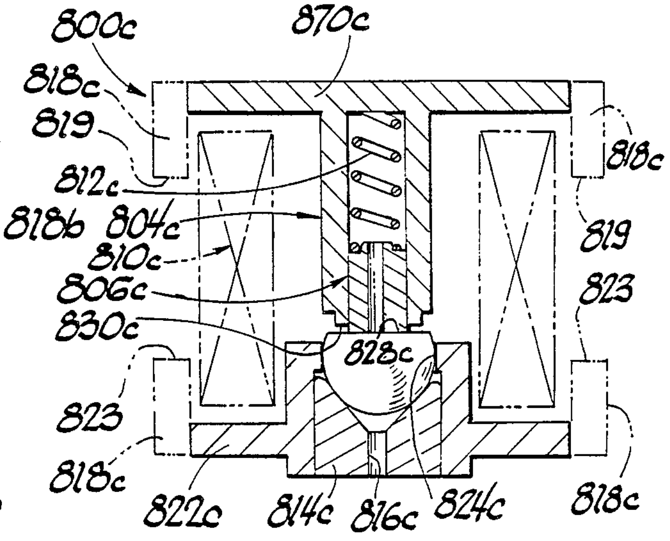
FIG. 23 is an axial cross-sectional view, in simplified form, of still another electromagnetic fluid valving assembly employing teachings of the invention.

In FIG. 23 all elements which are like or similar to those of either FIGS. 19 or 22 are identified with like reference numbers provided with a suffix "c". Unless specifically noted to the contrary, the operation of the structure of FIG. 23 is as described with reference to FIG. 19 and the characteristic flux density thereof is as generally represented in and discussed with reference to FIG. 21.

In comparing the structures of FIGS. 23, 22 and 19, it can be seen that the structure of FIG. 23 is provided with an upper wall **870*c* of magnetic material and that such upper wall is of circular outer configuration as is the lower wall 822*c*. In the embodiment of FIG. 23 the inventive magnetic open loop characteristic is achieved by elimination of all or a cylindrical portion of the cylindrical side wall as shown at, for example, 718, 818 and 818*b* of FIGS. 18, 19 and 22, respectively. In actual use, the upper wall 870*c* and lower wall 822*c* would, of course, be suitably supported as to maintain an operating relationship. It is also contemplated, as already implied, that some portion or portions of the annular side wall may exist as generally depicted in phantom lines at 818*c*. In any event, the inventive magnetic open loop is achieved by a gap of non-magnetic material, in the said stationary portion, as between the upper wall 870*c* and lower wall 822*c* or, as between the juxtaposed circular or annular ends 819 and 823 of the contemplated annular side wall 818*c*. In view of the embodiment of FIG. 23** it should be apparent that the non-magnetic material forming the "gap of non-magnetic material" in the said stationary portion, may be a gaseous medium such as, for example, ambient air.

With FIGS. 19, 22 and 23 in mind and referring back to FIGS. 16 and 17, it can be seen that the inventive magnetic open loop exists in the embodiments of each of FIGS. 16 and 17. For example, in the embodiment of FIG. 16 there is a lower magnetic end wall 92, an annular cylindrical side wall 96 of magnetic material and, of course the magnetic pole piece means 117. However, there is a gap of non-magnetic material at the upper end and, in this instance, such gap of non-magnetic material is the ambient air space. That is, the magnetic annular side wall 96 is not closed or bridged by an upper magnetic end wall nor is the pole piece means 117 connected to the magnetic cylindrical side wall 96.

In the embodiment of FIG. 17 the gap of non-magnetic material is formed by the support member 406 which effectively forms an upper wall of the electromagnetic assembly. Even though the support member 406 is secured as to the upper end of the cylindrical side wall 404 of magnetic material, the inventive magnetic open loop is created because the support member 406, being of non-magnetic material, forms the said gap of non-magnetic material. Further, in accordance with the concept depicted in FIG. 22, the pole piece means 536 of FIG. 17 is also magnetically isolated from the magnetic cylindrical side wall 404 by virtue of its being supported by the non-magnetic support member 406.

As should be evident, each of the embodiments of FIGS. 16 and 17 exhibits the characteristic flux density curve of FIG. 21 in that the flux density is more rapidly created (than in the prior art) and located in the area where it is most effective for causing pull-in of the armature and, further, because of the creation of an enhanced flux field leakage, in a selected or controlled area the decay time thereof is greatly reduced with the result that the armature (upon coil de-energization) is quickly released for its return stroke by the associated spring means. Compared to the known best prior art, electromagnetic assemblies embodying teachings of the invention have a far superior electromagnetic efficiency and operate at much higher frequencies which, in turn, translates to much faster pull-in and release times for the armature or, in terms of a valving function, much faster opening and closing times.

Figure 24:
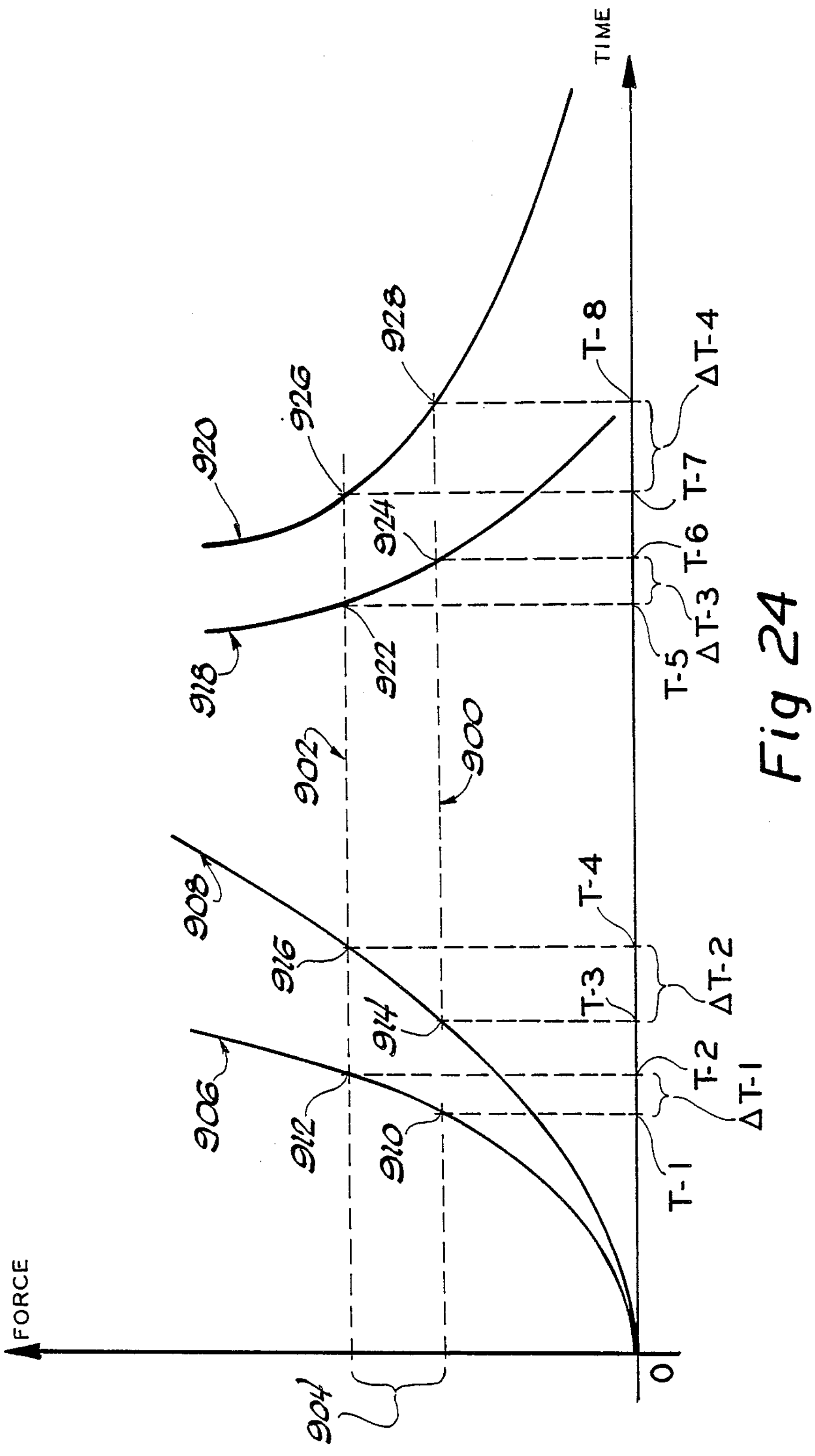
FIG. 24 is a graph illustrating the influence of magnetic force build-up and decay on delay times.

Previously, a "band of uncertainty" in electromagnetic liquid valving assemblies was referred to. FIG. 24 is intended to graphically depict the benefits derived from electromagnetic valving assemblies of the invention as compared to those of the prior art. The graph of FIG. 24, in a generally typical manner, illustrates the influence of magnetic force build-up and decay (or delay) times for two classes of electromagnetic valving assemblies (one class being that of the prior art and the other class being that of the invention) wherein, for purposes of illustration, the band of uncertainty is assumed to be the same for each class.

With greater reference to FIG. 24, the vertical axis represents an increasing magnitude of magnetic force developed by the magnetic flux in the electromagnetic assembly while the horizontal axis represents a time scale. The lower horizontal dash-line 900 represents the lowest magnitude of generated magnetic force which, at times, will be functionally effective to achieve the required result and which, for purposes of definition and illustration, is assumed to define the lower level or magnitude of magnetic force in the said band of uncertainty. The upper horizontal dash-line 902 represents the highest or greatest magnitude of generated magnetic force which, at times, will be functionally effective to achieve the required result and which, for purposes of definition and illustration, is assumed to define the upper level or magnitude of magnetic force in the said band of uncertainty. For purposes of reference the span indicated by bracket 904 depicts such overall band of uncertainty.

Because electromagnetic assemblies of the invention no longer require any permanent air gap as between the armature and pole piece means and because the space (when in a de-energized state) between the pole piece and armature is located at least near to the area or location of the strongest magnetic flux, the magnetic efficiency is greatly increased (compared to the prior art) which, in turn, means a much quicker build-up in magnetic flux and such translates into much faster armature pull-in (or valve opening) times.

Further, compared to the prior art, electromagnets employing teachings of the invention have a high reluctance due to the inventive magnetic open loop employing a gap of non-magnetic material in said stationary portion. Because of the very high reluctance of electromagnets of the invention, such electromagnets exhibit a very rapid (much more than the prior art) flux decay which, in turn, results in a quicker release of the armature and therefore, with respect to valving assemblies, a much quicker closing time.

With such operating characteristics of electromagnets, and in particular electromagnetic valving assemblies of the invention and of the prior art in mind, let curve 906 of FIG. 24 represent the magnetic force build-up (or increase upon coil energization) of an electromagnetic valving assembly employing teachings of the invention. Further, let curve 908 of FIG. 24 represent the magnetic force build-up (or increase upon coil energization) of a prior art electromagnetic valving assembly. As consistent with the disclosure hereinbefore presented, the rate of magnetic force build-up, in terms of time, represented by curve 906 is quicker than that of curve 908.

If the then existing conditions and factors, hereinbefore described as determining the said band of uncertainty, were such as to cause armature pull-in (valve opening) at the lowest magnitude of magnetic force (depicted by dash-line 900) then the armature of the invention would be pulled-in (or the valve would be opened) as at point 910. On the horizontal axis such point 910 corresponds to a time T-1. However, if the then existing conditions and factors were such as to cause armature pull-in (valve opening) at the highest or greatest magnitude of magnetic force (depicted by dash-line 902) then the armature of the invention would be pulled-in (the valve would be opened) as at point 912. On the horizontal axis such point 912 corresponds to a time T-2.

Now with regard to the prior art, if the then existing conditions and factors, hereinbefore described as determining the said band of uncertainty, were such as to cause armature pull-in (valve opening) at the lowest magnitude of magnetic force (depicted by dash-line 900) then the armature of the prior art would be pulled-in (the valve would be opened) as at point 914. On the horizontal axis such point 914 corresponds to a time T-3. However, if the then existing conditions and factors were such as to cause armature pull-in (valve opening) at the highest or greatest magnitude of magnetic force (depicted by dash-line 902) then the armature of the prior art would be pulled-in (the valve would be opened) as at point 916. On the horizontal axis such point 916 corresponds to a time T-4.

Now considering the release and closing times, curve 918 of FIG. 24 is intended to represent the magnetic flux decay in electromagnetic assemblies employing teachings of the invention while curve 920 is intended to represent the magnetic flux decay of a prior art electromagnetic assembly. As consistent with the disclosure hereinbefore presented, the rate of flux decay, in terms of time, represented by curve 918 is quicker than that of curve 920.

With respect to curve 918, if the then existing conditions and factors, hereinbefore described as determining the said band of uncertainty, were such as to result in the release of the armature (valve closure) at the highest or greatest magnitude of magnetic force (depicted by dash-line 902) then the armature of the invention would be released (the valve closed) as at point 922. On the horizontal axis such point 922 corresponds to a time T-5. However, if the then existing conditions and factors were such as to result in the release of the armature (valve closure) at the lowest magnitude of magnetic force (depicted by dash-line 900) then the armature of the invention would be released (the valve closed) as at point 924. On the horizontal axis such point 924 corresponds to a time T-6.

Now with regard to the prior art, if the then existing conditions and factors, hereinbefore described as determining said band of uncertainty, were such as to result in the release of the armature (valve closure) at the highest or greatest magnitude of magnetic force (depicted by dash-line 902) then the armature of the prior art would be released (the valve closed) as at point 926. On the horizontal axis such point 926 corresponds to a time T-7. However, if the then existing conditions and factors were such as to result in the release of the armature (valve closure) at the lowest magnitude of magnetic force (depicted by dash-line 900) then the armature of the prior art would be released (the valve closed) as at point 928. On the horizontal axis such point 928 corresponds to a time T-8.

For ease of reference, in FIG. 24 the difference in time between: (a) T-1 and T-2 is identified as ΔT1; (b) T-3 and T-4 is identified as ΔT2; (c) T-5 and T-6 is identified as ΔT3 and (d) T-7 and T-8 is identified as ΔT4.

An inspection of FIG. 24 will show that ΔT1 is substantially less than ΔT2 which, of course, means that by comparison the pull-in of the armature (valve opening) of the invention has greater uniformity and consistency than that of the prior art. Likewise, ΔT3 is substantially less than ΔT4 which means that by comparison the release of the armature (valve closing) of the invention also has greater uniformity and consistency than that of the prior art, with both of these being referenced to time, even though the said band of uncertainty is assumed to be the same for both the prior art and the invention.

Further, as far as speed of operation or response time is concerned, it can be seen that regardless of whether the armature of the invention is pulled-in at point 910 or point 912 that the time of occurrence thereof (respectively T-1 and T-2) is still far less than either times T-3 or T-4 for the prior art structure. Similarly, the release time of the armature of the invention, regardless of whether such release occurs at point 922 or point 924, that the time of occurrence thereof (respectively T-5 and T-6) is far less than either times T-7 or T-8 for the prior art structure.

Accordingly, it should be apparent that electromagnetic assemblies employing teachings of the invention are, among other things: more magnetically efficient; substantially faster in operation; substantially more uniform in terms of time in the pull-in and release of the armature and substantially more uniform and consistent in their operating characteristics than the electromagnetic assemblies of the prior art.

Figure 25:
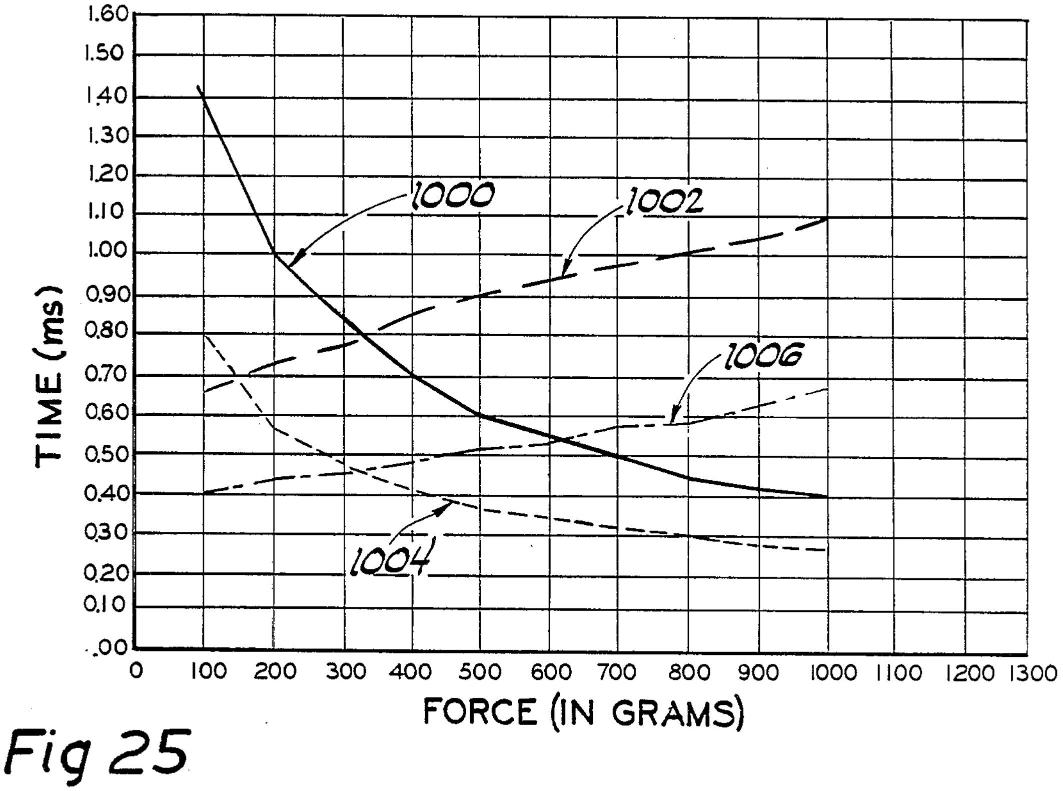
FIG. 25 is a graph depicting the characteristic opening and closing times of electromagnetic fluid valving assemblies employing teachings of the invention and electromagnetic fluid valving assemblies according to the prior art.

FIG. 25 graphically illustrates the armature-valve opening and closing times of two electromagnetic valving assemblies which for all practical purposes were identical to each other except that one of such assemblies employed the inventive magnetic open loop (as hereinbefore disclosed and defined) of the invention while the other assembly employed the magnetic closed loop of the prior art.

In FIG. 25 the vertical axis is the time axis in terms of milliseconds while the horizontal axis is the corresponding return spring load force in terms of grams. In FIG. 25 plotted curve 1000 represents the closing time of a prior art magnetic closed loop electromagnetic valving assembly and plotted curve 1002 represents the opening time of the same prior art electromagnetic valving assembly. In comparison, plotted curve 1004 represents the closing time of a magnetic open loop electromagnetic valving assembly of the invention while plotted curve 1006 represents the opening time of the same magnetic open loop electromagnetic valving assembly. As is evident from the comparative curves, of the graph of FIG. 25, the opening and closing times of the magnetic open loop electromagnetic assembly of the invention are not only substantially faster but actually dramatically faster than the opening and closing times of the prior art electromagnetic assembly.

Figure 26:
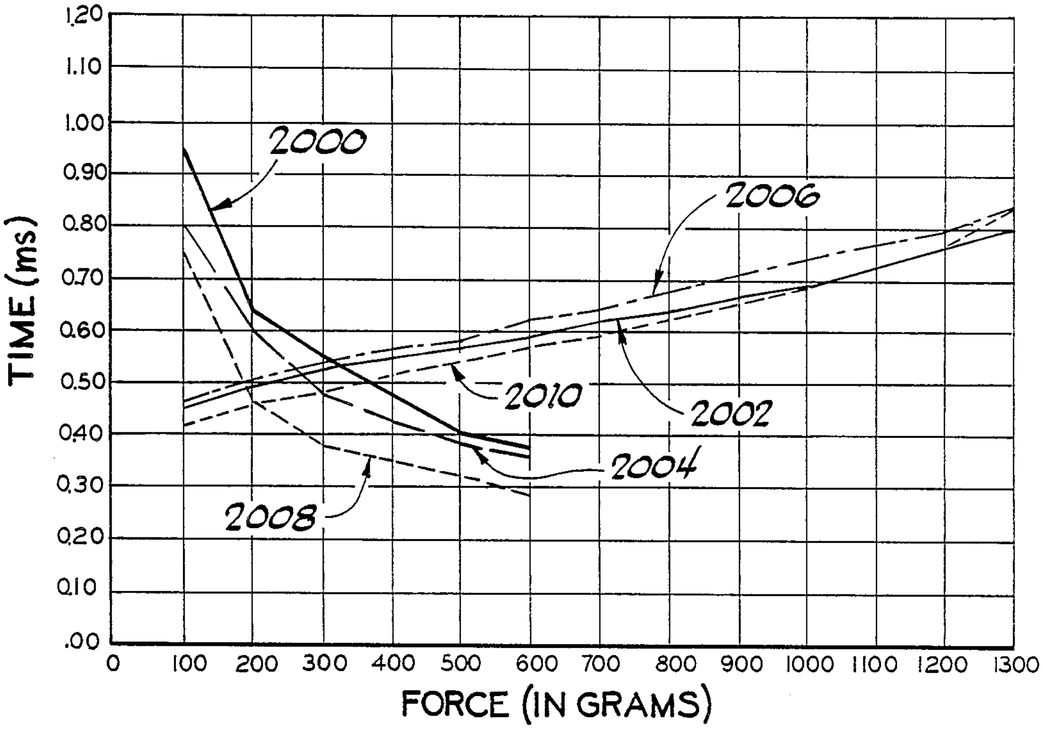
FIG. 26 is a graph depicting opening and closing times compared to return spring loads for three electromagnetic assemblies employing teachings of the invention but respectively formed of different magnetic materials.

While testing electromagnetic assemblies employing teachings of the invention, a further unexpected benefit was discovered. FIG. 26 graphically illustrates such unexpected benefit. In FIG. 26 the opening and closing times of three magnetic open loop electromagnetic assemblies of the invention were plotted against the return spring loads (force) for such assemblies. Such three assemblies differed from each other only in the magnetic material used for forming the said stationary portion of the electromagnetic assembly. The three materials thusly employed were; (a) low carbon steel, (b) silicon iron and (c) Grade 416 stainless steel none of which were annealed.

In FIG. 26 the vertical axis is the time axis in terms of milliseconds while the horizontal axis is the corresponding return spring load force in terms of grams. In FIG. 26 the plotted curves 2000 and 2002 respectively represent the closing time and opening time (versus spring load) for an electromagnetic assembly of the invention employing low carbon steel; plotted curves 2004 and 2006 respectively represent the closing time and opening time (versus spring load) for an electromagnetic assembly of the invention employing silicon iron and plotted curves 2008 and 2010 respectively represent the closing time and opening time (versus spring load) for an electromagnetic assembly of the invention employing Grade 416 stainless steel.

FIG. 26 graphically illustrates the fact that even though three completely different magnetic materials were employed in such magnetic open loop electromagnets, the resulting performance curves are very closely grouped especially when contrasted with the prior art magnetic closed loop electromagnets which exhibit a very wide range of such performance curves with similarly differing materials. Consequently, it is apparent that providing a gap of non-magnetic material, as to create the inventive magnetic open loop, results in an electromagnetic assembly which exhibits a very low sensitivity to changes or variations in the magnetic properties of the materials used in forming said stationary portion.

It should be pointed out that during testing and experimentation it has been determined that optimum performance of the inventive magnetic open loop circuit herein described and disclosed is achieved when at least a certain minimum relationship is achieved in the structure employing such inventive magnetic open loop. When such a minimum relationship is achieved then the full benefits of controlled flux leakage, rapid armature pull-in time and rapid flux decay and armature release are attained.

More particularly, it has been discovered that the gap in the otherwise magnetic material of the stationary or non-moving portion of the electromagnetic motor or circuit should be of a dimension equal to at least 40.0% of the distance between the outer surface of the pole piece means and the inner surface of the magnetic outer housing with the measurement of such distance being taken as on a plane perpendicular to the axis of the pole piece and passing through the axial mid-point of the associated coil means. The following would be by way of example. That is, in FIG. 16, the imaginary measuring plane would be perpendicular to axis 208, pass through the pole piece 117 and through the axial mid-point of coil means 106. The radial distance (hereinafter referred to as "gauge distance"), along such imaginary plane, between the outer surface of the pole piece 117 and the inner surface of the outer tubular housing 96 would be measured and the "magnetic gap" (previously described) as generally existing above the coil means 106 would then have to have a radial length of at least 40.0% of said "gauge distance".

With reference to FIG. 17, the imaginary measuring plane would be perpendicular to the axis of pole piece means 536, pass through the pole piece 536 and through the axial mid-point of coil means 526. The "gauge distance" along such imaginary plane, between the outer surface of the pole piece 508 and the inner surface of housing body 404 would be measured and the "magnetic gap", previously described as comprising the non-magnetic support wall 406, would then have to have a radial length of at least 40.0% of said "gauge distance".

With reference to FIG. 19, the imaginary plane would be perpendicular to the axis 826 of pole piece means 804, pass through the pole piece 804 and through the axial mid-point of the coil means 810. The "gauge distance" along such imaginary plane, between the outer surface of the pole piece 804 and the inner surface of housing 802 would be measured and the "magnetic gap", as represented by the annular non-magnetic means 821, would then have to have a radial length of at least 40.0% of said "gauge distance".

With reference to FIG. 22, the imaginary plane would be perpendicular to the axis **826*b* of pole piece means 804*b*, pass through the pole piece 804*b* and through the axial mid-point of the coil means 810*b*. The "gauge distance" along the imaginary plane, between the outer surface of the pole piece 804*b* and the inner surface of the housing 802*b* would be measured and the "magnetic gap", as presented by the non-magnetic cylinder or support 872 would have a minimum diameter of 40.0% of said "gauge distance". Further, if the diameter of such support 872 were to be made significantly less than 40.0% of said "gauge distance" then it would be preferred that the effective axial length of such non-magnetic support 872, as measured from the inner surface of upper wall 870 to the effective upper end of the pole piece 804*b*** be at least 40.0% of said "gauge distance".

With reference to FIG. 23, the imaginary plane would be perpendicular to the axis of pole piece **804*c*, pass through the pole piece 804*c* and through the axial mid-point of the coil means 810*c*. The "gauge distance", in this embodiment, would be established along the imaginary plane between the outer surface of the pole piece 804*c* and the inner surface of what would in turn be an imaginary cylindrical outer housing wall if such were provided to closely contain the circular outer periphery of upper and lower walls 870*c* and 822*c*. In that case the "magnetic gap" as measured between the inner surfaces of the upper and lower end walls 870*c* and 822*c* would be equal to at least 40.0% of said "gauge distance". In the event that the embodiment of FIG. 23 were to be provided with either or both a cylindrical depending wall portion 818*c* or a cylindrical upstanding wall portion 818*c*, the "gauge distance" would be similarly determined as by measuring to the inner surface of the imaginary extension of such depending and/or upstanding cylindrical wall portions and the "magnetic gap", generally cylindrical in configuration, would have an axial length, as for example between spaced surfaces 819 and 823**, of at least 40.0% of the "gauge distance".

Throughout this application, including the claims, terms and/or expressions such as, for example: (a) "gap of non-magnetic material"; (b) "a magnetic interruption"; (c) "magnetic open loop circuit"; (d) "significant gap of non-magnetic material"; (e) "significant non-magnetic interruption"; (f) "significantly non-magnetic interruption"; (g) "significant gap"; (h) "magnetic disconnection" and (i) "gap-forming means of non-magnetic material" as well as other similar terms and expressions have been employed. In addition to whatever particular definitions may have been specifically ascribed to such terms and/or expressions, it is to be understood that each of such terms and/or expressions are to be read as meaning a distance or length of at least 40.0% the "gauge distance" as herein disclosed and described.

Further, it is to be understood that when either: (a) a "gap of non-magnetic material"; (b) a magnetic interruption"; (c) "magnetic open loop circuit"; (d) "significant gap of non-magnetic material"; (e) "significant non-magnetic interruption"; (f) "significantly non-magnetic interruption"; (g) "significant gap"; (h) "magnetic disconnection" or (i) "gap-forming means of non-magnetic material", as well as other similar terms and expressions, are employed in either the disclosure or claims hereof, such are neither intended nor do apply to structures, in the general field of this invention, which might be said to have such formed exclusively in the end wall of the stationary portion of the electromagnetic body means through which end wall the armature means is either guided or received. That is, by way of example and more particularly, referring to any of FIGS. 16, 17, 19, 22 and 23, it will be seen that the "gap of non-magnetic material" exists in: (1) the upper end or upper end wall, and not in the lower end wall (92, 414 and 822), as in FIGS. 16, 17 and 19; (2) the pole piece means or pole piece support means (872), and not in the lower end wall (**822*b*), as in FIG. 22 and (3) in the generally cylindrical side wall, and not in the lower end wall (822*c*), as in FIG. 23**. Nowhere is it disclosed nor is it intended that the inventive "gap of non-magnetic material" of the invention be located exclusively in or exclusively form the lower end wall (which by definition is that axially situated wall which guides and/or receives the armature means) of the stationary portion of the electromagnetic body means. It has been determined that such a "gap of non-magnetic material" (of dimensions at least as large as herein defined) when formed in, or actually forming, the axially situated end wall, which wall guides and/or receives the armature means, does not provide the benefits herein described as obtained by having the "gap of non-magnetic material" located in either the: (a) cylindrical side wall; (b) upper axial end wall (opposite to said lower axial end wall) or (c) pole piece means or pole piece support means.

In view of the foregoing it is apparent that a fuel metering and injection system employing an electromagnetic valving assembly using teachings of the invention will result in superior fuel metering characteristics as compared to the prior art. Further, it should be obvious that an electromagnetic assembly employing teachings of the invention will in and of itself function with superior operating characteristics regardless of the environment in which it may be employed.

Although only a preferred embodiment and selected variations and modifications of the invention have been disclosed and described, it is apparent that other embodiments and modifications of the invention are possible within the scope of the appended claims.

What is claimed is:

1. An improvement in a fuel supply system of an internal combustion engine, having a single fuel metering valve assembly supplying fuel to a plurality of cylinders of said engine, each of said cylinders having intake port means at one end of an individual fuel line connected for the flow of fuel thereinto, the opposite end of each fuel line being operatively connected to the fuel metering valve assembly, the fuel metering valve assembly having a number of fuel discharge passages corresponding in number to the number of fuel lines, air chamber means continguous to said discharge passages for receiving superatmospheric air therein, and means connecting respective ones of said fuel lines to respective ones of said discharge passages across said air chamber means and said superatmospheric air therein, the fuel discharged from said fuel discharge passages and said superatmospheric air combining to form a fuel-air mixture of atomized fuel and air, whereby said fuel-air mixture flows through the fuel lines for an equal distribution to each cylinder, wherein said improvement comprises said fuel metering valve assembly comprising electromagnetic motor means, wherein said electromagnetic motor means comprises stationary magnetic body means at least in part comprised of magnetic material, said magnetic body means being formed as to have an axis of revolution and further comprising transverse wall means, pole piece means situated as to be centrally of and stationary with respect to said magnetic body means, electrical coil means effective upon energization thereof to create a magnetic flux loop, armature means, said transverse wall means extending generally transversely of said axis of revolution and effective to at least in part receive said armature means, said armature means being moved into contact with said pole piece means upon energization of said coil means, said magnetic body means and said pole piece means functioning to provide a path for said flux loop about said electrical coil means upon energization thereof, wherein said path of said flux loop is comprised of a non-moving portion of said electromagnetic motor means and of a moving portion of said electromagnetic motor means, wherein said moving portion of said electromagnetic motor means comprises said armature means, wherein said non-moving portion of said electromagnetic motor means comprises said pole piece means and said stationary magnetic body means, and additional means forming a magnetic interruption in said non-moving portion of said electromagnetic motor means for enhancing flux leakage thereby reducing the flux decay time in said flux loop, wherein said armature means comprises a valving member for alternatingly permitting and terminating the flow of said fuel through said fuel discharge passages, and wherein said additional means forming said magnetic interruption comprises gap-forming means of non-magnetic material in said non-moving portion, and wherein said gap-forming means of non-magnetic material is at most only partly in said transverse wall means.

2. An improvement according to claim 1 wherein said fuel metering valve assembly comprises a fuel discharge body, and wherein said fuel discharge passages are formed in said fuel discharge body as to be generally circumferentially oriented and angularly spaced from each other.

3. An improvement according to claim 1 wherein said fuel metering valve assembly comprises inlet means for receiving fuel from an associated source which fuel is subsequently flowed to said discharge passages, and wherein said fuel in flowing to said discharge passages flows through said gap-forming means of non-magnetic material.

4. An improvement according to claim 1 wherein said stationary magnetic body means comprises cylindrical wall means, wherein said cylindrical wall means is situated generally radially outwardly of said coil means, wherein said transverse wall means is situated at an axial end of said coil means in close proximity to said armature means, and pole piece support means, said pole piece support means being effective to maintain said pole piece means stationary with respect to said cylindrical wall means and said transverse wall means, said pole piece support means being effective to establish said magnetic interruption as between said pole piece means and said cylindrical wall means as to provide for magnetic disconnection therebetween.

5. An improvement in apparatus for the uniform distribution of fuel to a multi-cylinder combustion engine having a plurality of conduits with respective ones of said conduits leading to the induction passage of respective ones of said cylinders of said engine, said improvement comprising a fuel metering device arranged to deliver metered quantities of fuel in accordance with the requirements of the cylinders of the engine, means defining fuel chamber means, a plurality of passages extending from said fuel chamber means one for each cylinder of the engine, respective ones of said plurality of passages being connected through respective ones of said conduits to the induction passage of one cylinder of said engine, and means for admitting superatmospheric air to an area downstream of each said passage and upstream of each said conduit for delivery of the metered fuel exiting each said passage, said superatmospheric air and metered fuel forming a fuel-air mixture delivered through each said conduit to the induction passage of an associated cylinder of said engine, said fuel metering device comprising electromagnetic motor means, wherein said electromagnetic motor means comprises stationary magnetic body means at least in part comprised of magnetic material, said magnetic body means being formed as to have an axis of revolution and further comprising transverse wall means, pole piece means situated as to be centrally of and stationary with respect to said magnetic body means, electrical coil means effective upon energization thereof to create a magnetic flux loop, armature means, said transverse wall means extending generally transversely of said axis of revolution and effective to at least in part receive said armature means, said armature means being moved into contact with said pole piece means upon energization of said coil means, said magnetic body means and said pole piece means functioning to provide a path for said flux loop about said electrical coil means upon energization thereof, wherein said path of said flux loop is comprised of a non-moving portion of said electromagnetic motor means and of a moving portion of said electromagnetic motor means, wherein said moving portion of said electromagnetic motor means comprises said armature means, wherein said non-moving portion of said electromagnetic motor means comprises said pole piece means and said stationary magnetic body means, and additional means forming a magnetic interruption in said non-moving portion of said electromagnetic motor means for enhancing flux leakage thereby reducing the flux decay time in said flux loop, wherein said armature means comprises a valving member for alternatingly permitting and terminating the flow of said fuel through said passages, and wherein said additional means forming said magnetic interruption comprises gap-forming means of non-magnetic material in said non-moving portion, and wherein said gap-forming means of non-magnetic material is at most only partly in said transverse wall means.

6. An improvement according to claim 5 wherein said stationary magnetic body means comprises cylindrical wall means, wherein said cylindrical wall means is situated generally radially outwardly of said coil means, wherein said transverse wall means is situated at an axial end of said coil means in close proximity to said armature means, and pole piece support means, said pole piece support means being effective to maintain said pole piece means stationary with respect to said cylindrical wall means and said transverse wall means, said pole piece support means being effective to establish said magnetic interruption as between said pole piece means and said cylindrical wall means as to provide for magnetic disconnection therebetween.

7. An improvement in a fuel metering and supply system for supplying metered fuel to a plurality of cylinders of an internal combustion engine, said system having a single fuel metering valving assembly, said valving assembly having a single variably positionable valving member, valve seat means with respect to which said valving member is cyclically moved to closed and opened positions, a plurality of transporter conduit means for transporting a fuel-air mixture to said plurality of cylinders, the number of said transporter conduit means in said plurality of transporter conduit means being equal to the number of cylinders in said plurality of cylinders, a plurality of fuel metering port means, a source of fuel under superatmospheric pressure for supplying fuel to said fuel metering port means when said valving member is moved toward said open position and thereby causing metered fuel to be discharged from said plurality of fuel metering port means, and air chamber means communicating with and situated upstream of said plurality of transporter conduit means and downstream of said fuel metering port means as to have said metered fuel flow therethrough, said air chamber means communicating with a source of air under superatmospheric pressure as to admit said superatmospheric air into said air chamber means, said superatmospheric air and said metered fuel in said air chamber means coacting with each other to form a fuel-air mixture, and wherein said fuel-air mixture flows through said plurality of transporter conduit means to said plurality of cylinders, wherein said improvement comprises said fuel metering valving assembly comprising electromagnetic motor means, wherein said electromagnetic motor means comprises stationary magnetic body means at least in part comprised of magnetic material, said magnetic body means being formed as to have an axis of revolution and further comprising transverse wall means, pole piece means situated as to be centrally of and stationary with respect to said magnetic body means, electrical coil means effective upon energization thereof to create a magnetic flux loop, armature means, said transverse wall means extending generally transversely of said axis of revolution and effective to at least in part receive said armature means, said armature means being moved into contact with said pole piece means upon energization of said coil means, said magnetic body means and said pole piece means functioning to provide a path for said flux loop about said electrical coil means upon energization thereof, wherein said path of said flux loop is comprised of a non-moving portion of said electromagnetic motor means and of a moving portion of said electromagnetic motor means, wherein said moving portion of said electromagnetic motor means comprises said armature means, wherein said non-moving portion of said electromagnetic motor means comprises said pole piece means and said stationary magnetic body means, and additional means forming a magnetic interruption in said non-moving portion of said electromagnetic motor means for enhancing flux leakage thereby reducing the flux decay time in said flux loop, wherein said armature means comprises said valving member for alternatingly permitting and terminating the flow of said fuel through said fuel metering port means, and wherein said additional means forming said magnetic interruption comprises gap-forming means of non-magnetic material in said non-moving portion, and wherein said gap-forming means of non-magnetic material is at most only partly in said transverse wall means.

8. An improvement according to claim 7 wherein said stationary magnetic body means comprises cylindrical wall means, wherein said cylindrical wall means is situated generally radially outwardly of said coil means, wherein said transverse wall means is situated at an axial end of said coil means in close proximity to said armature means, and pole piece support means, said pole piece support means being effective to maintain said pole piece means stationary with respect to said cylindrical wall means and said transverse wall means, said pole piece support means being effective to establish said magnetic interruption as between said pole piece means and said cylindrical wall means as to provide for magnetic disconnection therebetween.

9. An improvement according to claim 7 and further comprising mixing chamber means, said mixing chamber means being situated immediately downstream of said air chamber means and effective to cause additional intermixing of said superatmospheric air and said metered fuel.

10. An improvement according to claim 7 wherein each of said transporter conduit means comprises an inlet situated immediately downstream of said air chamber means, wherein said inlet comprises a flow-through mixing chamber means of generally diminishing cross-sectional flow area as said mixing chamber means extends away from said air chamber means, said air mixing chamber means being effective to cause additional intermixing of said superatmospheric air and said metered fuel as such flow out of said air chamber means.

11. An improvement according to claim 7 and further comprising pressure regulator means, said pressure regulator means being responsive to the pressure magnitudes of both said air under superatmospheric pressure and said fuel under superatmospheric pressure as to maintain a substantially constant pressure differential therebetween and across said fuel metering port means.

12. An improvement according to claim 7 wherein the magnitude of the pressure of said superatmospheric air as is supplied to said air chamber means is unregulated, wherein the magnitude of the pressure of said fuel under superatmospheric pressure as is supplied to said fuel metering port means is unregulated, and further comprising pressure responsive means responsive to the magnitudes of pressures of both said superatmospheric air and said fuel under superatmospheric pressure for maintaining a substantially constant pressure differential therebetween and across said fuel metering port means.

13. A valving assembly for cyclically permitting and terminating fluid flow, comprising stationary magnetic body means at least in part comprised of magnetic material, said magnetic body means being formed as to have a first axis of revolution and further comprising transverse wall means, pole piece means situated as to be centrally of and functioning stationary with respect to said magnetic body means, electrical coil means effective upon energization thereof to create a magnetic flux loop, valve seat means, fluid flow passage means formed through said valve seat means, said pole piece means comprising a pole piece face portion, an armature-valve member situated generally between said pole piece face portion and said valve seat means, said transverse wall means extending generally transversely of said axis of revolution and effective to at least in part receive said armature-valve member, resilient means normally resiliently urging said armature-valve member in a first direction whereby said armature-valve member moves toward operative seating engagement with said valve seat means as to thereby terminate flow of said fluid through said fluid flow passage means, said armature-valve member being moved in a second direction opposite to said first direction and into contact with said pole piece face portion upon energization of said coil means thereby permitting flow of said fluid through said fluid flow passage means, said magnetic body means and said pole piece means functioning to provide a path for said flux loop about said electrical coil means upon energization thereof, wherein said path of said flux loop is comprised of a non-moving portion and of a moving portion, wherein said moving portion comprises said armature-valve member, wherein said non-moving portion comprises said pole piece means and said stationary magnetic body means, and gap-forming means of non-magnetic material having a second axis for revolution substantially aligned with said first axis of revolution, said gap-forming means of non-magnetic material forming a magnetic interruption in said non-moving portion for enhancing flux leakage in the vicinity of said gap-forming means of non-magnetic material thereby reducing the flux decay time in said flux loop upon de-energization of said coil means and enabling said resilient means to move said armature-valve in said first direction, and wherein said gap-forming means of non-magnetic material is at most only partly in said transverse wall means.

14. An electromagnetic motor, comprising stationary magnetic body means at least in part comprised of magnetic material, said magnetic body means being formed as to have an axis of revolution and further comprising transverse wall means, pole piece means situated as to be centrally of and stationary with respect to said magnetic body means, electrical coil means effective upon energization thereof to create a magnetic flux loop, armature means, said transverse wall means extending generally transversely of said axis of revolution and effective for at least in part receiving said armature means, said armature means being moved into contact with said pole piece means upon energization of said coil means, said magnetic body means and said pole piece means functioning to provide a path for said flux loop about said electrical coil means upon energization thereof, wherein said path of said flux loop is comprised of a non-moving portion of said electromagnetic motor and of a moving portion of said electromagnetic motor, wherein said moving portion of said electromagnetic motor comprises said armature means, wherein said non-moving portion of said electromagnetic motor comprises said pole piece means and said stationary magnetic body means, and additional means forming a significantly non-magnetic interruption in said non-moving portion of said electromagnetic motor for enhancing flux leakage thereby reducing the flux decay time in said flux loop, and wherein said significantly non-magnetic interruption is at most only partly in said transverse wall means.

15. An electromagnetic motor according to claim 14 wherein said stationary magnetic body means is of generally tubular configuration.

16. An electromagnetic motor according to claim 14 wherein said armature means is at least in part tubular in configuration.

17. An electromagnetic motor according to claim 14 wherein said armature means is at least in part spherical in configuration.

18. An electromagnetic motor according to claim 14 wherein said additional means forming said magnetic interruption comprises a significant gap of non-magnetic material in said non-moving portion.

19. An electromagnetic motor according to claim 18 wherein said non-magnetic material of said significant gap of non-magnetic material comprises a gaseous medium.

20. An electromagnetic motor according to claim 18 wherein said non-magnetic material of said significant gap of non-magnetic material comprises ambient air.

21. An electromagnetic motor according to claim 14 wherein said additional means forming said magnetic interruption comprises a gap of non-magnetic material in said non-moving portion, and wherein said gap of non-magnetic material is situated between said stationary magnetic body means and said pole piece means.

22. An electromagnetic motor according to claim 14 wherein said additional means forming said magnetic interruption comprises a gap of non-magnetic material, and wherein said non-magnetic material of said gap of non-magnetic material structurally supports said pole piece means in a stationary relationship with respect to said stationary magnetic body means.

23. An electromagnetic motor according to claim 14 wherein said stationary magnetic body means comprises cylindrical wall means situated generally radially outwardly of said coil means, wherein said additional means forming said magnetic interruption comprises a gap of non-magnetic material, and wherein said gap of non-magnetic material exists in said cylindrical wall means.

24. An electromagnetic motor according to claim 14 wherein said stationary magnetic body means further comprises first axial end wall means formed as a body of revolution about said axis of revolution and situated at a first axial end of said coil means, second axial end wall means formed as a body of revolution about said axis of revolution and situated at a second axial end of said coil means opposite to said first axial end of said coil means, wherein said first axial end wall means comprises said transverse wall means, wherein said additional means forming said magnetic interruption comprises a gap of non-magnetic material between said first and second axial end wall means as to provide for magnetic disconnection therebetween.

25. An electromagnetic motor according to claim 14 wherein said stationary magnetic body means comprises cylindrical wall means of magnetic material and axial end wall means, wherein said cylindrical wall means is situated generally radially outwardly of said coil means, wherein said axial end wall means comprises said transverse wall means, wherein said transverse wall means is situated at an axial end of said coil means in close proximity to said armature means, and pole piece support means, said pole piece support means being effective to maintain said pole piece means stationary with respect to said cylindrical wall means and said axial end wall means, said pole piece support means being effective to establish said magnetic interruption as between said pole piece means and said cylindrical wall means as to provide for magnetic disconnection therebetween.

26. An electromagnetic motor according to claim 25 wherein said pole piece support means comprises a stem-like member extending axially of and through said axial end wall means as to have said coil means situated circumferentially about and spaced from said stem-like member, wherein said pole piece means is of generally cylindrical configuration and fixedly carried by said stem-like member, wherein said armature means is of generally tubular configuration, and wherein said armature means is piloted on said stem-like member as to be movable relative thereto.

27. An electromagnetic motor according to claim 25 wherein said axial end wall means is of generally annular configuration and physically separable from said cylindrical wall means.

28. An electromagnetic motor according to claim 25 wherein said pole piece support means comprises second axial end wall means axially spaced from the first mentioned axial end wall means as to have said coil means situated axially between said first mentioned axial end wall means and said second axial end wall means, and wherein said second axial end wall means is formed of non-magnetic material.

29. An electromagnetic motor according to claim 28 wherein said pole piece means is operatively carried by said second axial end wall means and adjustably positionable with respect thereto.

30. An electromagnetic motor according to claim 29 wherein said armature means is at least in part spherical in configuration.

31. An electromagnetic motor according to claim 28 wherein said pole piece means is of generally tubular configuration.

32. An electromagnetic motor according to claim 28 wherein said support means for said pole piece means comprises bobbin means for carrying said coil means, and wherein said pole piece means is axially threadably adjustable relative to said cylindrical wall means.

33. A valving assembly according to claim 13 wherein said pole piece means is of generally tubular configuration, wherein said fluid flow passage means comprises a plurality of fluid flow passages, and further comprising fluid flow discharge body means, wherein at least certain of said plurality of fluid flow passages are formed in said fluid discharge body means as to be generally circumferentially oriented and angularly spaced from each other, wherein said valving assembly comprises inlet means for receiving said fluid flow from an associated source which fluid is substantially flowed to said plurality of fluid flow passages, and wherein said fluid in flowing to said plurality of fluid flow passages flows through said gap-forming means of non-magnetic material.

34. A valving assembly according to claim 13 wherein said stationary magnetic body means is of generally tubular configuration.

35. A valving assembly according to claim 13 wherein said armature-valve member is at least in part tubular in configuration.

36. A valving assembly according to claim 13 wherein said armature-valve member is at least in part spherical in configuration.

37. A valving assembly according to claim 13 wherein said non-magnetic material comprises a gaseous medium.

38. A valving assembly according to claim 37 wherein said gaseous medium comprises ambient air.

39. A valving assembly according to claim 13 wherein said gap-forming means of non-magnetic material is situated between said stationary magnetic body means and said pole piece means as to form said magnetic interruption from said stationary magnetic body means to said pole piece means.

40. A valving assembly according to claim 13 wherein said gap of non-magnetic material structurally supports said pole piece means in a stationary relationship with respect to said stationary magnetic body means.

41. A valving assembly according to claim 13 wherein said magnetic body means comprises cylindrical wall means situated generally radially outwardly of said coil means, and wherein said gap-forming means of non-magnetic material exists entirely in said cylindrical wall means.

42. A valving assembly according to claim 13 wherein said stationary magnetic body means further comprises first axial end wall means formed as a body of revolution about said first axis of revolution and situated at a first axial end of said coil means, second axial end wall means formed as a body of revolution about said first axis of revolution and situated at a second axial end of said coil means opposite to said first axial end of said coil means, wherein said first axial end wall means comprises said transverse wall means, and wherein said gap-forming means of non-magnetic material exists between said first and second axial end wall means as to provide for magnetic disconnection therebetween.

43. A valving assembly according to claim 13 wherein said stationary magnetic body means comprises cylindrical wall means of magnetic material, wherein said cylindrical wall means is situated generally radially outwardly of said coil means, wherein said transverse wall means is situated at an axial end of said coil means in close proximity to said armature-valve member, and wherein said gap-forming means of non-magnetic material comprises support means for said pole piece means, said support means being effective to maintain said pole piece means stationary with respect to said cylindrical wall means and said transverse wall means, said support means being effective to provide for magnetic disconnection between said pole piece means and said cylindrical wall means.

44. A valving assembly according to claim 43 wherein said support means comprises axial end wall means axially spaced from said transverse wall means as to have said coil means situated axially between said transverse wall means and said axial end wall means, said axial end wall means being formed of non-magnetic material.

45. A valving assembly according to claim 44 wherein said pole piece means is operatively carried by said axial end wall means and adjustably positionable with respect thereto.

46. A valving assembly according to claim 43 wherein said armature-valve member is at least in part spherical in configuration.

47. A valving assembly according to claim 43 wherein said pole piece means is of generally tubular configuration.

48. A valving assembly according to claim 43 wherein said support means for said pole piece means comprises bobbin means for carrying said coil means, and wherein said pole piece means is axially threadably adjustable relative to said cylindrical wall means.

49. A valving assembly according to claim 13 wherein said fluid flow passage means comprises a plurality of fluid flow passages.

50. A fuel metering valve assembly for metering fuel to an associated combustion engine, comprising magnetic housing means at least in part of magnetic material, said housing means comprising tubular cylindrical wall means, a transversely situated axial end wall, pole piece means situated as to be centrally of and stationary with respect to said magnetic means, said pole piece means comprising pole piece end face means, electrical coil means effective upon energization thereof to create a magnetic flux loop, armature-valve means, said transversely situated axial end wall being effective to at least in part receive said armature-valve means, said armature-valve means comprising armature-valve end face means, said armature-valve means being moved as to have said armature-valve end face means contact with said pole piece end face mean upon energization of said coil means, and stem-like support means situated as to be extending centrally of and stationary with respect to said magnetic housing means, said stem-like support means comprising a valve seating portion and an axially extending generally cylindrical support portion, fuel flow passage means formed through said valve seating portion, wherein said pole piece means is of generally cylindrical configuration and is carried by said support portion, wherein said armature-valve means is of generally tubular cylindrical configuration and slidably received by said support portion for movement relative thereto, said armature-valve means comprising a valving portion effective to at times be in seating engagement with said valve seating portion to thereby terminate the flow through said fuel flow passage means, resilient means effective for resiliently urging said armature-valve means in a first direction to a first position whereat said valving portion comes into said seating engagement with said valve seating portion, wherein upon energization of said coil means said armature-valve means is moved against the resilient resistance of said resilient means in a second direction opposite to said first direction as to a second position whereat said armature-valve end face means contacts said pole piece end face means and said valving portion moved away from said valve seating portion permits the flow of fuel through said fuel flow passage means, said magnetic housing means and said pole piece means functioning to provide a path for said flux loop about said electrical coil means upon energization thereof, wherein said path of said flux loop is comprised of a non-moving portion and of a moving portion, wherein said moving portion comprises said armature-valve means, wherein said non-moving portion comprises said pole piece means and said stationary magnetic body means, and continuous gap-forming means of non-magnetic material forming a magnetic interruption in said non-moving portion for enhancing flux leakage in the vicinity of said gap-forming means of non-magnetic material thereby reducing the flux decay time in said flux loop upon de-energization of said coil means and enabling said resilient means to move said armature-valve means in said first direction, and wherein said gap-forming means of non-magnetic material is at most only partly in said transversely situated axial end wall.

51. A fuel metering valve assembly according to claim 50 wherein said fuel flow passage means comprises a plurality of fuel flow passages.

52. A fuel metering valve assembly according to claim 50 wherein said pole piece means is axially threadably adjustable relative to said support portion.

53. A fuel metering valve assembly according to claim 50 and further comprising annular recess means formed in said valve seating portion, wherein said fuel flow passage means comprises a plurality of fuel flow passages, wherein each of said plurality of fuel flow passages communicates with said annular recess means, and wherein when said valving portion is in said seating engagement with said valve seating portion said valving portion covers said annular recess means.

54. A fuel metering valve assembly according to claim 53 and further comprising additional passage means formed through the wall of said tubular armature-valve means, said additional passage means being effective to provide for free flow of fuel from an area radially outwardly of said armature-valve means to an annulus which is radially inwardly of said armature-valve means and radially outwardly of said support portion.

55. A fuel metering valve assembly according to claim 50 wherein said coil means comprises first and second axial ends, wherein said first axial end of said coil means is directed generally towards said axial end wall, wherein said second axial end of said coil means is directed in a direction opposite from said first axial end and away from said axial end wall, and wherein said tubular cylindrical wall means of said housing means is free of any axial end wall of magnetic material traversing and engaging said tubular cylindrical wall means in the vicinity of said second axial end of said coil means.

56. A fuel metering valve assembly according to claim 55 and further comprising bobbin means, said bobbin means carrying said coil means and comprising a centrally situated passage, wherein at least a part of said axially extending generally cylindrical support portion extends into said centrally situated passage of said bobbin means, wherein at least a major portion of said pole piece means is located within said centrally situated passage of said bobbin means, fuel inlet means leading to said centrally situated passage of said bobbin means, and wherein fuel admitted by said inlet means flows to said fuel flow passage means by flowing through said centrally situated passage of said bobbin means and about said pole piece means.

57. A fuel metering valve assembly according to claim 56 wherein said armature-valve means extends through clearance passage means formed in said axial end wall and into said centrally situated passage of said bobbin means, and wherein said fuel flowing through said centrally situated passage of said bobbin means and about said pole piece means continues to flow through said clearance passage means and about said armature-valve means.

58. A fuel metering valve assembly according to claim 57 wherein said axial end wall is separate from but in contact with said tubular cylindrical wall means.

59. A fuel metering valve assembly according to claim 58 wherein said bobbin means is molded into said tubular cylindrical wall means.

* * * * *